(12) United States Patent
Scheer et al.

(10) Patent No.: US 6,182,555 B1
(45) Date of Patent: Feb. 6, 2001

(54) APPARATUS AND METHODS FOR BREWING AND DISPENSING BEVERAGES

(75) Inventors: Rick Scheer; Jeff Farris, both of Dallas, TX (US)

(73) Assignee: Red River Tea Company, Dallas, TX (US)

( * ) Notice: Under 35 U.S.C. 154(b), the term of this patent shall be extended for 0 days.

(21) Appl. No.: 09/287,943

(22) Filed: Apr. 7, 1999

(51) Int. Cl.[7] .................................................. A47J 31/40
(52) U.S. Cl. ............................... 99/290; 99/282; 99/280; 99/289 R; 222/129.4; 222/129.1
(58) Field of Search .................................. 99/290, 280, 281, 99/282, 289 R; 222/146.1, 129.1, 129.2, 129.3, 129.4, 640

(56) References Cited

U.S. PATENT DOCUMENTS

| | | | |
|---|---|---|---|
| 4,211,342 | 7/1980 | Jamgochian et al. | 222/129.4 |
| 4,649,809 | 3/1987 | Kanezashi | 99/290 |
| 4,793,244 | * 12/1988 | King | 99/285 |
| 5,116,632 | 5/1992 | Miller | 426/597 |
| 5,163,356 | * 11/1992 | Chigira | 99/290 X |
| 5,207,148 | * 5/1993 | Anderson et al. | 99/280 X |
| 5,245,914 | 9/1993 | Vitous | 99/280 |
| 5,255,593 | * 10/1993 | Bunn et al. | 99/280 |
| 5,265,518 | * 11/1993 | Resse et al. | 99/290 X |
| 5,479,849 | 1/1996 | King et al. | 99/287 |
| 5,549,035 | * 8/1996 | Wing-Chung | 99/281 |
| 5,680,809 | 10/1997 | Dings et al. | 99/289 D |
| 5,724,883 | * 3/1998 | Usherovich | 99/304 X |

* cited by examiner

Primary Examiner—Reginald L. Alexander
(74) Attorney, Agent, or Firm—J. Mark Holland; Tom H. Dao

(57) ABSTRACT

A brewing machine freshly brews a single-serving of coffee or tea to be served hot or cold. The machine preferably includes a housing assembly, with a window therein to permit the viewing of the brewing of a fresh serving of coffee or tea, a water supply, a dry coffee or tea storage area, a brewer, and a flavor additive storage area. The coffee or tea is preferably brewed in a condensed form which becomes diluted to drinking strength by the addition of hot or cool water, and/or by the addition of hot or cool flavorings. The cool drink can subsequently be served over ice to provide a cold serving of iced coffee or tea. Mixing the various ingredients to obtain the final cup of coffee or tea preferably occurs in the user's cup. Preferred methods of making a freshly brewed single-serving of coffee or tea are disclosed.

21 Claims, 17 Drawing Sheets

APPARATUS AND METHODS FOR BREWING AND DISPENSING BEVERAGES

This invention generally relates to brewing machines, and specifically to an improved apparatus and methods for brewing and dispensing single servings of hot or cold tea or coffee which is attractive, compact, simple to use, and easy to maintain. The invention will find particular use in convenience stores, restaurants, offices, or wherever it is desirous for a business to provide beverage-dispensing machines to consumers and where space, money, and time are precious commodities. The preferred machine is generally portable and can be readily used anywhere there is a supply of water and electricity.

BACKGROUND OF THE INVENTION

During the past several years, coffee and tea consumption has been increasing, as demonstrated by the rapidly increasing number of specialty coffeehouses and teashops around the nation. Among other things, studies have shown that tea has several substances that can benefit people's health. The surge in popularity has been particularly noteworthy in the convenience store market through the growth in sales and consumption of "ready-to-drink" beverages. Consumers shopping in convenience stores, like consumers in specialty shops, appreciate a high quality, flavorful product at a reasonable price. Thus, the invention described herein is directed to a brewing system that provides fresh, high quality, flavorful beverage products and affords numerous conveniences to consumers and owners.

Traditionally, coffee or tea machines, both for personal and business use, brew large quantities (e.g. pots) of coffee or tea that are designed to serve multiple individuals. Because these beverages are made in such large quantities and are usually maintained in a brewed, liquid state, their flavor and consistency degrade over time making the beverages less desirable or even undrinkable, and thus, the remaining pot of coffee or tea typically gets discarded. With the increasing prices of these commodities, the wasted coffee or tea results in significant amounts of wasted money.

With these prior art machines, it is inconvenient or impossible to brew smaller, fresh individual servings of coffee or tea. Even if a prior art machine is designed to brew small batches (rather than multiple cups), the machines typically require the user to invest a significant amount of time and effort to clean the components of the machine from the previous pot of coffee or tea, to attempt to measure the proper amount of the coffee or tea to be brewed, and to wait for the entire brewing process to complete for a single serving. As indicated, typical prior art machines do not have components that are suitable for properly brewing smaller quantities of beverages.

In addition, if the user wishes to flavor his drink with any suitable additive (such as cream, sugar, honey, syrup, fruit flavoring, etc.), he will have to keep a supply of the additive nearby and add it to the cup as he prepares his drink. This can present significant problems where space is not readily available, and it increases costs by requiring the maintenance, cleaning, and inventory of not only the additives but the various equipment needed to store and mix the additives. These problems directly affect the profitability for any retailer (especially retailers such as convenience stores) attempting to provide drinks for consumers.

Some machines have attempted to overcome some of these shortcomings. For example, U.S. Pat. Nos. 4,211,342 (to Jamgochian et al.), and 4,649,809 (to Kanezashi), describe machines that are capable of preparing individual servings of various beverages including hot or cold coffee, tea, hot chocolate, and cold soda. Furthermore, these machines permit the consumer to choose from a variety of items to add to the beverage to alter the flavor of the drink.

Unfortunately, these machines are relatively complicated, and typically require a substantial investment of money to purchase or lease, and maintain; thus making them impractical if not impossible for small businesses to use them. Moreover, these machines typically occupy a relatively large amount of space, making them inconvenient (and less profitable) for use in businesses such as convenience stores and restaurants where space is crucial.

In addition, the mixing of the beverage additives in such prior art machines typically occurs at some stage prior to final dispense of the beverage. This increases the possibility of decreasing the quality of subsequent beverages from the machine (such as by flavor contamination by different and unwanted additives), and correspondingly makes cleaning of those areas more crucial and typically more difficult.

Another prior art machine (U.S. Pat. No. 5,724,883 to Usherovich) teaches a smaller brewer that brews both hot or cold drinks. However, this machine, much like traditional brewers, suffers from various shortcomings, including the inability to properly and rapidly brew single-servings, and also suffers from the inability to be easily cleaned or maintained.

To overcome the shortcomings of prior art brewing machines, the invention described herein preferably is a compact, easily used and maintained, brewing machine that freshly and quickly brews a single serving of tea or coffee. Each time a user or customer activates the preferred machine, the machine places tea leaves or coffee grounds in a brewing chamber, adds hot water, and brews the tea or coffee. Furthermore, the invention preferably permits the brewing of either hot or cold beverages as well as enables the user to select from a wide variety of flavors when choosing his single serving of coffee or tea. The preferred embodiment of the invention is also programmable to, among other things, assign unique flavor combinations, brewing times, water level, and other attributes to each beverage selection button. In addition, the invention preferably includes a display screen that displays messages, such as instructing a consumer on how to make his cup of tea or coffee, and instructing and assisting the machine's owner or operator to modify and program the operation and other aspects of the machine (such as by leading the owner through a series of menu choices).

OBJECTS AND ADVANTAGES OF THE INVENTION

It is, therefore, an object of the invention to provide an improved brewing system that quickly makes a fresh, single serving of hot or cold beverages. The preferred machine is compact, quick and easy to use, and easy to maintain.

It is another object of the invention to provide an apparatus for freshly brewing and dispensing a single-serving of a beverage including the following components: at least one water tank; a temperature regulator to regulate water temperature in the water tank; a control system by which a user can request the brewing and dispensing of a single-serving of a beverage; a measuring device and a dispenser to measure and dispense a select quantity of water for the fresh brewing in response to the control system; at least one storage area to store a dry form of the beverage; and a brewer including at least one outflow member; wherein the brewer receives the dry form of the beverage from the storage area and receives water from the water tank to brew the beverage, and the outflow member directs the flow of the beverage from the brewer to a container for use by the user.

It is a further object of the invention to provide the apparatus of the aforementioned character further including a housing apparatus wherein each of the components are contained within the housing apparatus. Preferably the housing apparatus is sufficiently small, strong, and lightweight to permit the ready positioning and use of the machine in a variety of locations, so that it is ready for use simply by connecting it to sources of electricity and water.

It is still a further object of the invention to provide the apparatus of the aforementioned character further including at least one opening in the housing apparatus to permit viewing of a brewing process.

It is yet another object of the invention to provide the apparatus of the aforementioned character further including at least one bin to store a beverage additive wherein the bin includes a measuring and dispensing device to measure and dispense the beverage additive to the beverage in response to the control system.

It is a further object of the invention to provide the apparatus of the aforementioned character wherein the beverage additive changes the flavor of the beverage.

It is yet another object of the invention to provide the apparatus of the aforementioned character further including at least one outlet located near the outflow member of the brewer wherein the outlet directs the outflow of a dilutant for the beverage.

It is another object of the invention to provide the apparatus of the aforementioned character wherein the dilutant changes the flavor of the beverage.

A still further object of the invention is to provide the apparatus of the aforementioned character wherein the dilutant changes the temperature of the beverage.

Another object of the invention is to provide an apparatus of the aforementioned character further including automated means to dispose of remnants of the brewed beverage from the brewer and a container to temporarily gather and accumulate the disposed remnants of the brewed beverage prior to final disposal. This is especially helpful in retail applications, to gather the used grounds or tea leaves from the preparation of multiple drinks, so that the final removal of those remnants from the machine is more efficient.

Yet another object of the invention is to provide an apparatus of the aforementioned character in which the control means further includes an electronic control display to facilitate a user's control over the selection and brewing of the beverage.

It is still a further object of the invention to provide an apparatus of the aforementioned character in which the control means further includes an electronic control display to facilitate maintaining and cleaning the apparatus.

It is another object of the invention to provide the apparatus of the aforementioned character wherein functionality of the electronic control display can be readily modified and updated. In the preferred embodiment, this is accomplished by programmable components.

It is still a further object of the invention to provide the apparatus of the aforementioned character wherein the beverage is tea.

Another object of the invention is to provide a tea brewing machine for quickly brewing a fresh, single-serving of tea, including a cabinet assembly, at least one water supply, a brewer, an outflow apparatus to receive the single-serving of tea from the brewer, at least one storage area for tea leaves prior to them being brewed, at least one storage area for tea additives, means for heating the water supply, means for selectively cooling the single serving of tea, and tea additive dispensing means for dispensing the tea additives from the storage area, wherein the tea additive dispensing means permits the generally simultaneous but independent outflow of brewed tea and tea additives into a container removable by a consumer.

An additional object of the invention is to provide a machine of the aforementioned character wherein the outflow apparatus includes a plurality of spouts for dispensing the tea and the tea additives.

It is yet another object of the invention to provide the machine of the aforementioned character further including a view port in the cabinet assembly to permit a user to observe certain internal operations of the machine.

It is still a further object of the invention to provide the machine of the aforementioned character further including a control panel to permit a consumer to select a preferred flavor and style of tea.

It is also an object of the invention to provide a method of brewing tea with a machine of the aforementioned character, including the steps of: the tea leaves falling into a brewing chamber of the brewer; dispensing hot water into the brewing chamber containing the tea leaves; and steeping the tea.

Another object of the invention is to provide an apparatus for making a serving of tea wherein the apparatus includes: an electronic control panel with an instructional message screen; at least one water inflow device; a water heating device; a brewer wherein the brewer receives dry leaves of tea from at least one tea storage bin and the brewer receives heated water after the receipt of the leaves of tea; an outflow member connected to the brewer to direct the outflow of the tea to a container removable by a consumer; and at least one element adjacent the outflow member for independently delivering a tea additive from a tea additive storage area to the container removable by a consumer, wherein the tea additive alters the flavor of the serving of tea.

It is a further object of the invention to provide a system for freshly brewing and dispensing a single-serving of a beverage including: at least one water tank; a temperature regulator to regulate water temperature in the water tank; a measuring device and a dispenser to measure and dispense a select quantity of water for the fresh brewing; at least one storage area to store a dry form of the beverage; a brewer including at least one outflow member wherein the brewer receives the dry form of the beverage from the storage area and receives water from the water tank to brew the beverage; and a control system by which a user can request brewing and dispensing of a single-serving of a beverage wherein the control system includes: a message display screen; a plurality of selectors for selecting a type of the beverage; and programmable components to permit a user to control brewing parameters of the beverage. Preferably, the controllable brewing parameters include: brewing time, dispensed beverage amount; dispensed hot water amount; or number of brewing cycles.

It is another object of the invention to provide an electronic control system for a brewing machine including: a message display screen; a plurality of selectors for selecting a type of drink; and programmable components providing customization of brewing parameters, dispensing parameters, and maintenance parameters.

A further object of the invention is to provide a method of making a single-serving of tea from an automated tea brewing and dispensing machine including the steps of: a) selecting a desired tea type; b) providing a heated water supply; c) dispensing dry tea leaves into a brew chamber; d) delivering heated water to the brew chamber; e) steeping the tea leaves; f) delivering brewed tea into a container for consuming the tea; and g) dispensing of the used tea leaves into a separate container.

Yet another object of the invention is to provide a method of the aforementioned character further including the steps of: a) providing at least one storage area for at least one tea additive; b) providing means for measuring and dispensing the tea additive; c) measuring and dispensing the tea additive into a mixing container; d) dissolving the tea additive in the mixing container with a predetermined amount of water; and e) delivering the dissolved flavoring into the container for consuming the tea concurrent with the delivery of brewed tea into the container. Additional steps may include: a) loading the container for consuming the tea with ice before the delivery of the brewed tea; and b) delivering a predetermined amount of ambient temperature water to the container for consuming the tea concurrent with the delivery of the brewed tea into the container and the delivery of the dissolved flavoring into the container.

It is yet another object of the invention to provide the method of the aforementioned character further including the steps of: a) providing a message display; b) displaying a message on the message display to instruct a user regarding making a serving of tea; and c) responding to the user's selections.

Other objects and advantages of the invention will be apparent from the following specification and the accompanying drawings, which are for the purpose of illustration only.

BRIEF DESCRIPTIONS OF THE DRAWINGS

DESCRIPTION OF PREFERRED EMBODIMENT

Figure 1:
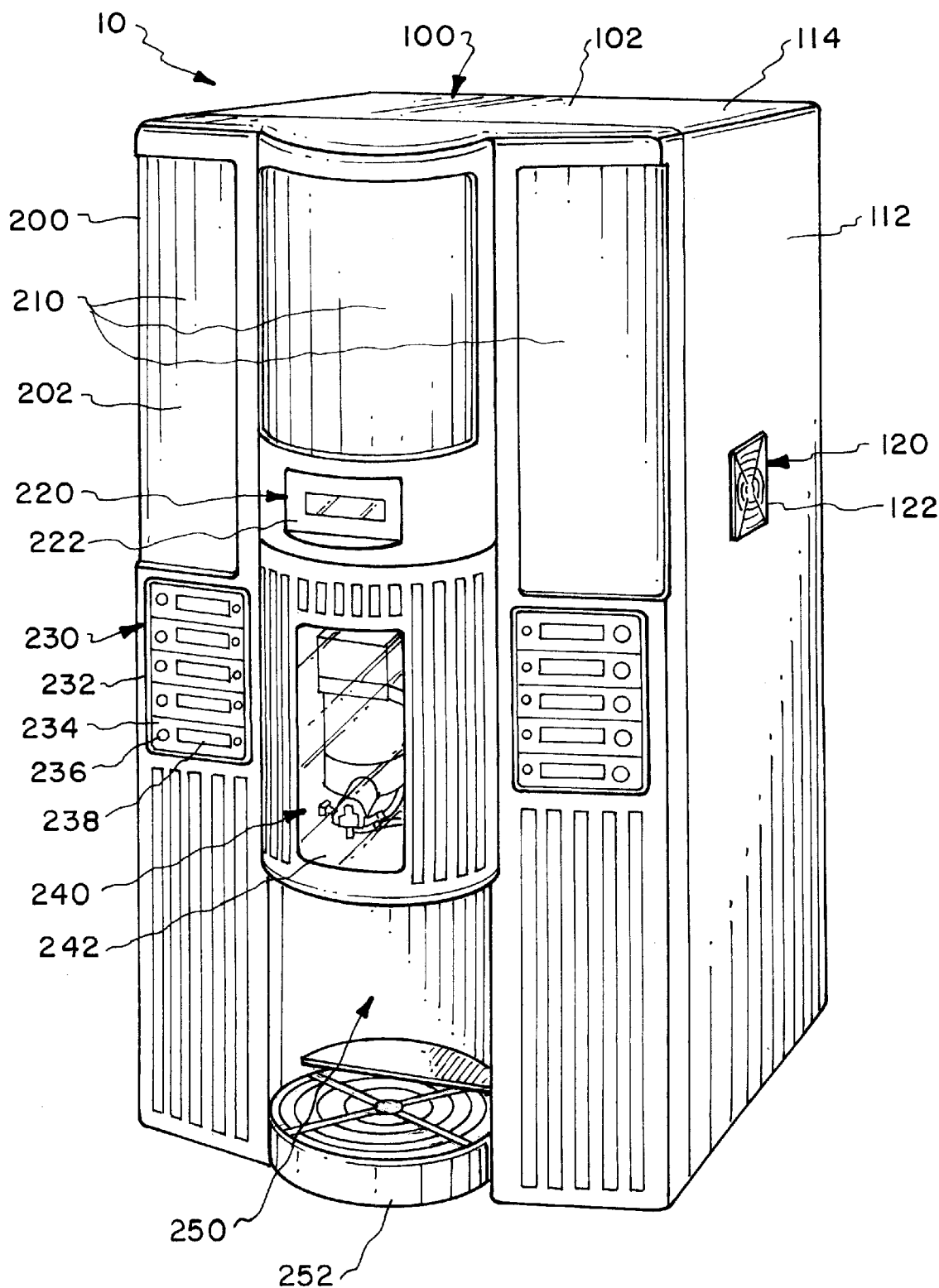
FIG. 1 is a perspective view of the front of a preferred embodiment of the invention.

Referring to the drawings, and particularly to FIG. 1 thereof, we show a preferred embodiment of a brewing system 10 assembled in accordance with the teachings of the invention. Although the following description, for the convenience of clarity and understanding, is primarily directed to a system for brewing tea, persons of ordinary skill in the art will understand that the brewing system can be used to brew any suitable beverage, including coffee, especially where it is desirable to provide increased combinations for beverage selection and where it is desirable to prepare the beverage in single servings rather than in large quantities.

The various components of the invention are preferably constructed from suitably strong, lightweight materials that permit ready installation, cleaning, and maintenance of the machine. Persons of ordinary skill in the art will understand that aluminum, stainless steel, plastic, and the like may be used for various of the components discussed herein, and that conventional electronic materials and components can be used for the control systems, but that other materials can also be used without departing from the spirit or scope of the invention.

The brewing apparatus 10 preferably includes a housing apparatus or cabinet assembly 100 and a door assembly or cabinet closure 200. In the preferred embodiment, the housing apparatus 100 includes two opposing sidewalls 112 and 113, a top wall 114, a bottom wall 115, and a rear wall 116. However, as will be apparent to persons of ordinary skill in the art, alternative embodiments of the invention can possess a housing assembly with any number of walls, or can even be installed and used without any housing, to provide a brewing system that quickly makes a fresh, single serving of hot or cold beverages, and that is compact, easy to use, and easy to maintain. Cabinet assembly 100 and cabinet closure 200, or portions thereof, can be made of any suitable material including plastic or metal. Furthermore, and as discussed more fully herein, the attachment of the various walls of the cabinet assembly to each other (and of the other various components of the invention to each other) can be obtained by any suitable means including welding, bolting, riveting, clipping, or even frictional engagement.

With reference to FIG. 1, the housing apparatus also preferably includes an exhaust system 120, such as exhaust member 122, preferably positioned in sidewall 112. Although exhaust member 122 is positioned in sidewall 112, alternative embodiments of the invention could place exhaust member 122 in any suitable location to facilitate the outflow of dust and moisture from the interior of the machine, and/or provide desirable cooling of internal components. As will be appreciated from FIG. 1 and FIG. 2, exhaust member 122 is preferably generally aligned with dispensing apparatuses 134 and ingredient receiving elements 1310 (see FIG. 2) to provide a system to remove dust that may result from the dispense of the dispensing apparatuses, and moisture from steam escaping from the element 1310. As indicated above, persons of ordinary skill in the art will also understand that exhaust system 120 can also act as a heat dispensing device, and that any number of heat dispensing devices, including vents or fans, could alternatively be included and/or positioned in other locations including sidewall 113, top wall 114, bottom wall 115, or rear wall 116 and still permit the desired cooling of the interior of the apparatus 10.

Door assembly 200 preferably is pivotably attached to housing apparatus 100 and preferably acts to enclose the components of the brewing machine yet permit access to the interior of the machine when the door is unlocked and opened. Door assembly 200 preferably further includes: display areas 210 for advertising, marketing, or any other purpose in which a display is needed (these display areas can be backlit or otherwise highlighted); a message display device or screen 220, such as an LED indicator 222; a selector area 230 to permit a user to select the beverage of his/her choice; a view port or opening 240, such as a viewing window 242 to permit a user to observe the brewing process; and a container filling area 250. The container filling area 250 preferably includes a cup holder plate 252.

The selector area 230 preferably constitutes an electronic control system including a control panel or display 232 wherein a plurality of beverage identifiers 234 are provided as means to identify the variety of beverages available to the user. As will be apparent to one of ordinary skill in the art, the number of beverage identifiers 234 preferably relates to the number of different types of beverages available to the user. In the preferred embodiment of the invention, two selector areas 230 are provided on the left and right sides of the door assembly 200. Each of the two selector areas 230 preferably includes five beverage identifiers 234, thereby permitting a total of ten different beverage selections.

Persons of ordinary skill in the art will understand that, although the preferred embodiment is illustrated as providing ten selections to a consumer, any desired number of selections can be included in the apparatus of the invention.

Each beverage identifier 234 preferably includes a selector 236 and a beverage-type display 238 identifying the type of beverage to be brewed and dispensed or served upon selection of the corresponding selector 236. Persons of ordinary skill in the art will understand that any suitable device can be provided to act as a selector 236; for example, the selector can be a button, a switch, a touch sensitive screen, or any other device that permits the selective brewing of a desired beverage satisfying a user's selection.

Door assembly 200 of the invention also preferably includes a view port 240 to provide a view of the brewing process as it occurs. One of the beneficial features of view port 240 is that it assures the user that his beverage is being freshly brewed upon his request, helping satisfy his desire for a freshly brewed drink. As can be appreciated from FIG. 1, view port 240 is preferably situated in front of the brewer of the machine, described more fully herein, when the machine is in its normal operating position. The view port 240 can also include a shielding member 242 to provide a physical barrier between the interior and the exterior of the machine. Shielding member 242 can be fabricated from any of a number of suitable materials, including plastic or glass, that provides a physical separation between the interior and exterior of the machine yet still provides an unobstructed view of the brewing process.

Figure 2:
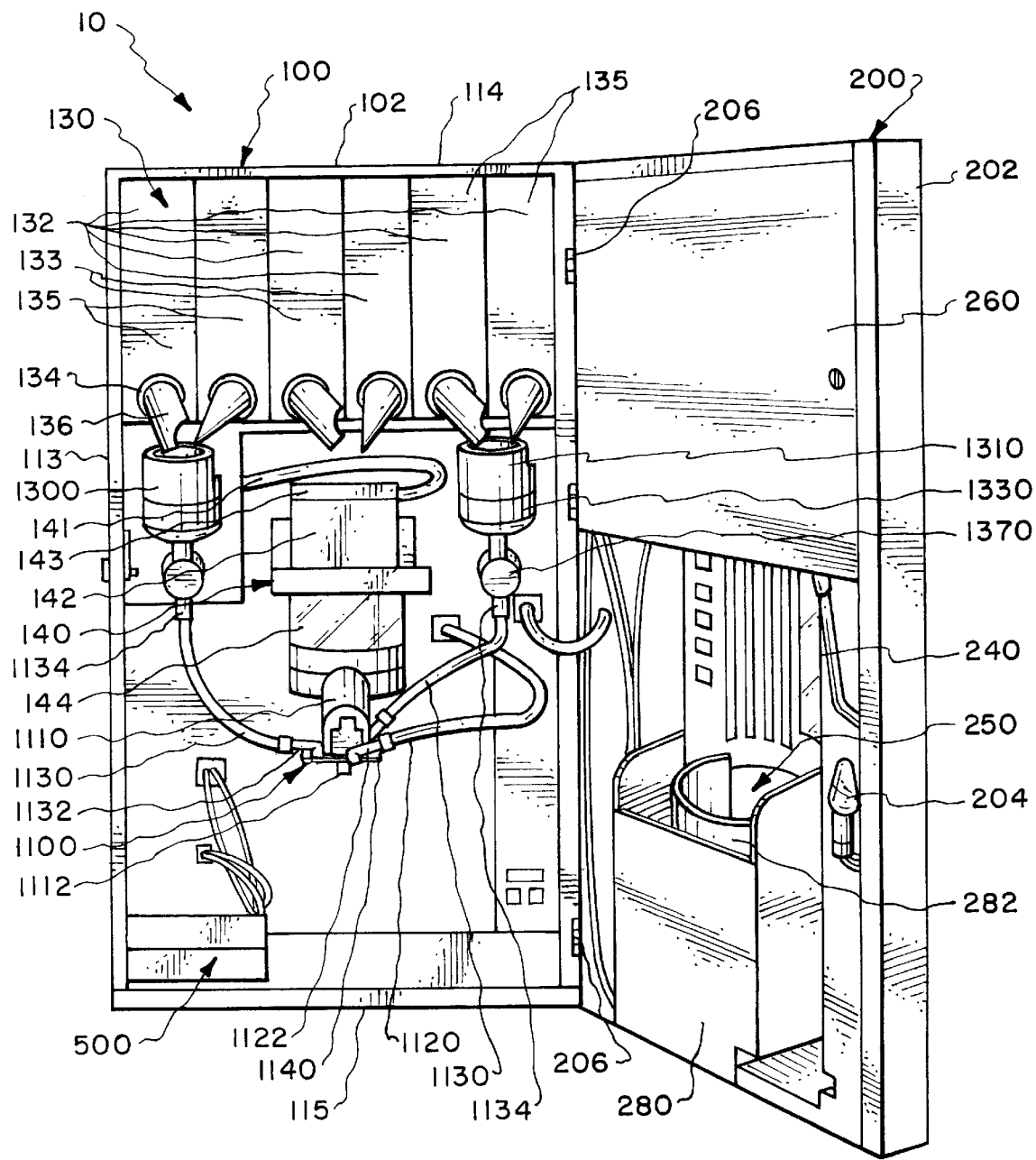
FIG. 2 is similar to FIG. 1, but illustrates the preferred arrangement of components inside the machine viewable when the door assembly is open.

FIG. 2 shows the preferred basic internal elements of the brewing machine 10, as seen when door assembly 200 is open. As mentioned above, door 200 is preferably pivotably attached to housing apparatus 100 at pivot points 206; pivot points 206 preferably constitute hinges. As can be appreciated in FIG. 2, the preferred door assembly 202 further includes a lighting device 204 to illuminate the brewing chamber as the brewing process is occurring, to facilitate the viewing of the process by the user through the view port 240, as discussed above. Understandably, the location of the lighting device 204 is not particularly critical as long as it provides sufficient illumination of the brewing chamber. Door assembly 202 also includes an inner cabinet assembly or housing 260, as discussed herein, to house various components for operating display areas 210 and message display device 220 discussed above.

FIG. 2 further illustrates the preferred components within housing apparatus 100 and their preferred spatial relationship to each other. In the preferred embodiment of the invention, an ingredient storage and dispenser assembly 130 is illustrated as a plurality of storage bins 132 situated preferably near the upper portion of the cabinet assembly 102. Each storage bin 132 includes an ingredient dispensing apparatus 134 including a dispensing element 138 (see FIG. 3, 3A, and 3B) and a product chute 136. As will be described in the method of operation herein, dispensing elements 138 are preferably augerlike structures, that are spiral-shaped and are configured to operatively engage with a motor to propel the ingredients into product chutes 136 to direct the flow of ingredients from storage bins 132 into the corresponding receptacles 1310 in a precisely controlled manner. Persons of ordinary skill in the art will understand that other arrangements of the components, and flow methods other than gravity can be used to manipulate the various ingredients.

As indicated above, the preferred plurality of storage bins 132 provides a variety of beverage options. The preferred embodiment of the invention includes two tea storage bins or areas 133 and four additive storage bins 135. Tea storage bins 133 are preferably located directly above a brewer 140; however, persons of ordinary skill in the art will understand that the spatial relationship between storage bins 133 and brewer 140 can vary depending upon a variety of factors and design considerations including, among other things, the methods of operation of the dispensing apparatuses 134.

The apparatus 10 also preferably includes two additive storage bins 135 located on both sides of the cabinet assembly 102. Each additive storage bin 135 includes a product chute 136 to direct the dispense of the beverage additive into a mixing assembly 1300, as discussed below. As described elsewhere herein, the preferred predetermined measurement and dispense of the additive and dry beverage are controlled by circuit boards and motor assemblies that constitute a measuring and dispensing device that responds to input received from the control system.

Persons of ordinary skill in the art will understand that the amount and type of ingredient(s) dispensed from the ingredient dispensing assembly 130 will depend on, among other things, the ingredients provided by the operator and, as discussed below, the programmed brewing parameters determined and set by the operator of the invention, as well as the particular selection made by the consumer. They will also understand that, depending on what type of ingredient is to be added, the ingredient may change the flavor and/or temperature of the brewed beverage.

As mentioned above, the preferred apparatus also includes a brewer 140, preferably located below tea storage bins 133. Any suitable brewer can be used, including any of a variety of commercially available brewers. The preferred embodiment of the invention utilizes a brewer such as shown in U.S. Pat. No. 5,479,849, owned by VKI Technologies, Inc. Specific details of the components and operation of the preferred brewer are disclosed in that U.S. Pat. No. 5,479,849, which is hereby incorporated by reference.

Generally, the preferred brewer 140 includes a brewing chamber 142 configured to receive tea or coffee from the storage bins 133 via chutes 136, and to receive hot water from a water dispenser or outflow device 143. That water is preferably supplied by a tubing 141 which receives a predetermined measured amount of water from a water supply or hot water tank 300 (see FIG. 4), discussed below. Brewer 140 also preferably includes a reservoir 144 to hold the brewed beverage after the tea or coffee has been steeped or brewed. The freshly brewed beverage then drains or flows from reservoir 144 to brewer outflow member or channel 1110 which connects an outflow opening of brewer 140 to an outflow apparatus or spout bracket assembly 1100, discussed below.

As can be further appreciated from FIG. 2, during operation (when the door 202 is closed) a preferred brewer outflow spout 1112 directs the flow of the brewed beverage to a container (such as a user's cup or mug) positioned within a container filling area 250, preferably below the brewer outflow spout 1112. Once the container is filled with the brewed beverage, the user can remove that container for consumption of the beverage.

In the preferred embodiment, the brewing process can be observed through the view port 240. Preferably, view port 240 is dimensioned and positioned to provide an unobstructed view of the tea leaves or coffee grounds and water falling into brew chamber 142, the operation of the brewer 140, the brewed beverage filling reservoir 144, and the brewed beverage dispensing through brewer outflow channel 1110, through brewer outflow spout 1112, and into the user's container.

Persons of ordinary skill in the art will further appreciate that, depending on the brewing system and the brewer used therein, and the type of beverages being prepared and served, it may be desirable to provide the simultaneous delivery of one or more beverages into multiple containers. Hence, alternative embodiments of the invention (not shown) can provide a plurality of brewers 140, and/or brewer outflow channels 1110 to meet this need.

As described above, the preferred embodiment of the invention includes four additive storage bins 135 and two mixing assemblies 1300. For convenience, only one of the mixing assemblies 1300 will be described with the understanding that the other is preferably identical in composition and operation and only differs with respect to the specific additive storage bins from which it receives ingredients. Persons of ordinary skill in the art will further appreciate that mixing assemblies 1300 can also constitute part of an additive dispensing means to facilitate the dispense and outflow of additives into the container receiving the brewed beverage.

Mixing assembly 1300 preferably includes an ingredient receiving element or funnel 1310 to receive and direct a dispensed ingredient from storage bin 135. The ingredient is directed to a mixing bowl 1330 wherein the ingredient is mixed with an inflow of water from a water tank 300 (see FIGS. 4 and 6). The ingredient and water are actively blended in a mixing chamber 1370 where they subsequently descend into tubing 1130 via connector 1134. The resulting liquid form of the ingredient is preferably dispensed from tubing 1130 via outflow spout 1132 where the flavored liquid can mix with a brewed beverage in a container.

Throughout the description of the invention, persons of ordinary skill in the art will realize that the tubing used for the invention can consist of any appropriate material. In the preferred embodiment, the tubing is made of plastic material to permit a high degree of flexibility and still provide an easy system for cleaning and or replacing. However, if necessary, tubing can also be made from metal such as copper or aluminum without departing from the spirit of the invention.

Although the ingredients stored in storage bins 135 are preferably dry and are water soluble, e.g. they are in powder form, in alternative embodiments, the ingredients can be stored as liquids that, depending on their concentration, can be further diluted by water in mixing chamber 1370 as described above, or can not be diluted and can thus be directly dispensed from bins 135 into a container for the brewed drink via tubing 1130 and outflow spout 1132.

As mentioned above, the preferred embodiment of the invention dispenses either hot or cool beverages. To obtain a hot beverage, persons of ordinary skill in the art will understand that when water is mixed with an ingredient, the water is preferably hot. To prepare a cool beverage, the brewing portion of the process preferably still occurs with hot water, but the resulting hot brewed beverage is mixed in the user's container or cup with ambient temperature water, which is dispensed through tubing 1120 and spout or outlet 1122. Tubing 1120 preferably receives ambient temperature water from a water tank 400 (see FIGS. 4 and 7) situated at the rear of the machine. Consumers can additionally cool the beverage by adding ice to the beverage container either prior to the dispense of the drink or after.

Persons of ordinary skill in the art will, therefore, understand that the brewing system can preferably brew and dispense a condensed form of the beverage that is diluted either with flavored hot water originating from mixing assembly 1300 or with hot water without any additive from mixing assembly 1300, or with room temperature water from tubing 1120. However, as described herein, the proper brew strength, brew volume, temperature, and dilution are all preferably controlled by programmable components that contribute to the versatility of the invention, and therefore, the settings can even be programmed to permit suitable brewing of a beverage without the addition of an unflavored dilutant. In the preferred embodiment, any of these features can be further adjusted and controlled by the operator of the machine.

FIG. 2 also illustrates the location of overflow tray assembly 500 situated at the lower left corner of housing apparatus 100. A preferred location for a waste container element 1400 (not shown in FIG. 2, but see FIG. 15) is at the lower right of the cabinet assembly 100. In the preferred embodiment, the waste container 1400 is preferably sized, positioned, and configured to receive discarded tea leaves or coffee grounds from brewer 140 as the discarded remains are scraped or ejected from the brewer 140. Preferably, these remnants or dregs fall behind the hoses 1120 and 1130 and into waste container 1400. Waste container 1400 is also preferably configured to provide easy removal from the cabinet assembly 100 for periodically emptying the contents within the waste container.

Among other things, the aforementioned control system can be programmed to monitor and alert the machine's operator as to when the waste container needs to be emptied. In the preferred embodiment, this occurs via tracking the number of beverages brewed by the machine, but alternative embodiments can include sensor elements operably positioned to sense the fullness of the waste container and to correspondingly transmit a signal to the control means to alert the operator, temporarily shut down the machine, or take other appropriate action.

Further details of the preferred embodiment of the invention are illustrated in the accompanying FIGS. 3 through 15. Because several of the components (e.g. connecting elements such as nuts, bolts, washers, or clamps), are repeated throughout the drawings and would be obvious to one of ordinary skill in the art to use those elements to assemble the inventive apparatus, they are not specifically noted and described in further detail.

Figure 3:
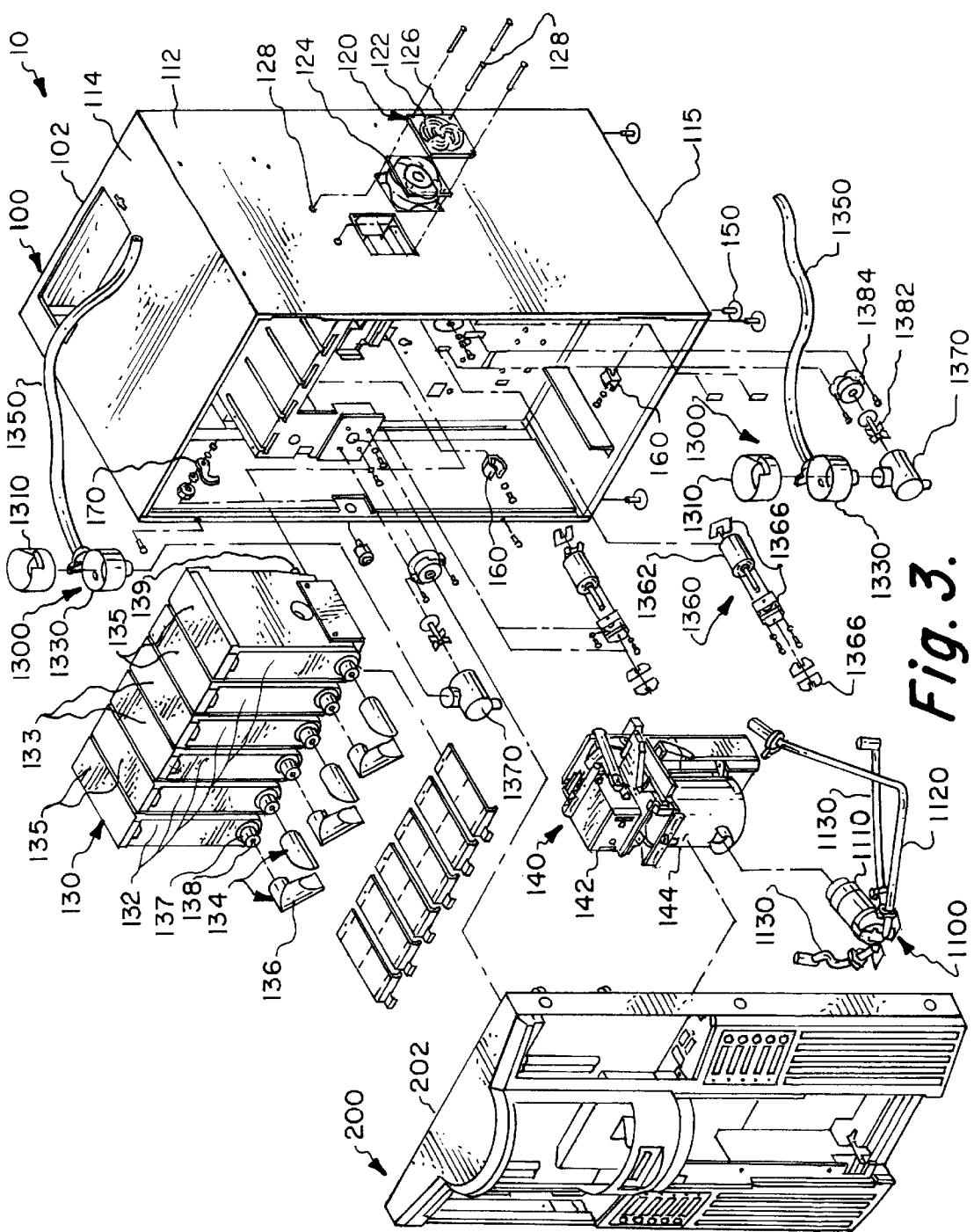
FIG. 3 is an exploded perspective view from the front upper right of a preferred embodiment of the invention.
Figure 3A:
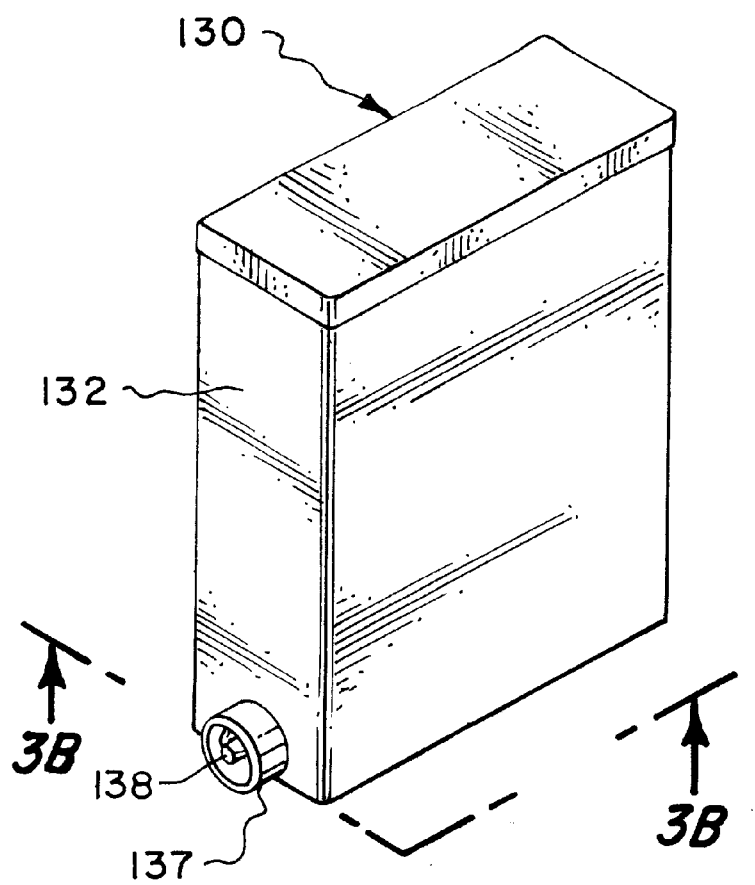
FIG. 3A is a perspective view of a single storage bin.
Figure 3B:
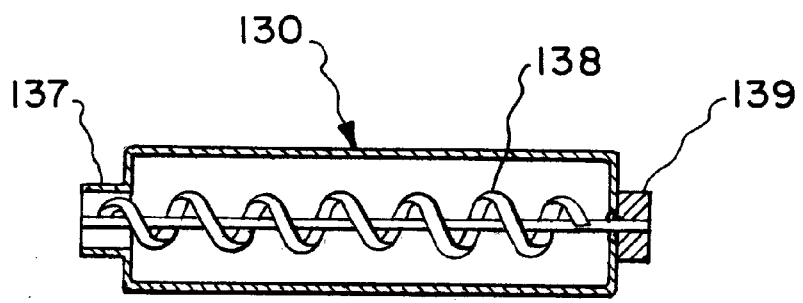
FIG. 3B is a sectional view along line 3B—3B in FIG. 3A.

In FIG. 3, the preferred embodiment of the invention includes a lock assembly 170 to permit the locking of the door 202 after it has been closed to prevent any unwanted disturbance or alteration of the interior components of the machine. Persons of ordinary skill in the art will understand that the nature, design, configuration, and placement of lock assembly 170 is not critical so long as it maintains a locking relationship with the door assembly 200 and the housing apparatus 100. For example, especially in a retail installation of the invention, the business owner typically will want to limit access to the interior of the machine to authorized maintenance personnel, who can be provided with keys to the lock 170.

Exhaust system 120 preferably includes exhaust fan 124 and grill fan 126 secured to sidewall 112 by connectors 128. In the preferred embodiment, connectors 128 consist of nuts and bolts, but (as with many or all of the various connections of the invention's components) they could also include rivets, screws, clips, spot welds, or any other means of connecting the exhaust system to the wall of the machine. To facilitate maintaining a desired temperature within the apparatus 10, feet members 150 are preferably provided to raise the bottom wall 115 away from the surface supporting the machine. This, among other things, permits air to flow freely around all exterior surfaces of the brewing system and thereby increasing the cooling of the heated surfaces.

With respect to the ingredient storage assembly 130, each of the storage bins 132 preferably includes a connecting element such as connector 137 to permit attachment of product chutes 136. In the preferred embodiment, the outer diameter of connector 137 is slightly smaller than the inner diameter of product chute 136 facilitating the frictional engagement between the connector and chute. The respective diameters of connectors 137 and product chutes 136 are sufficient to permit the adequate dispense of the ingredients from the storage bins into their receptacles. Storage bins 132 are preferably secured to the chassis of the brewing machine by way of lock plates 138, which can themselves be secured to the chassis by any suitable manner including screwing, riveting, clipping, or welding.

Figure 4:
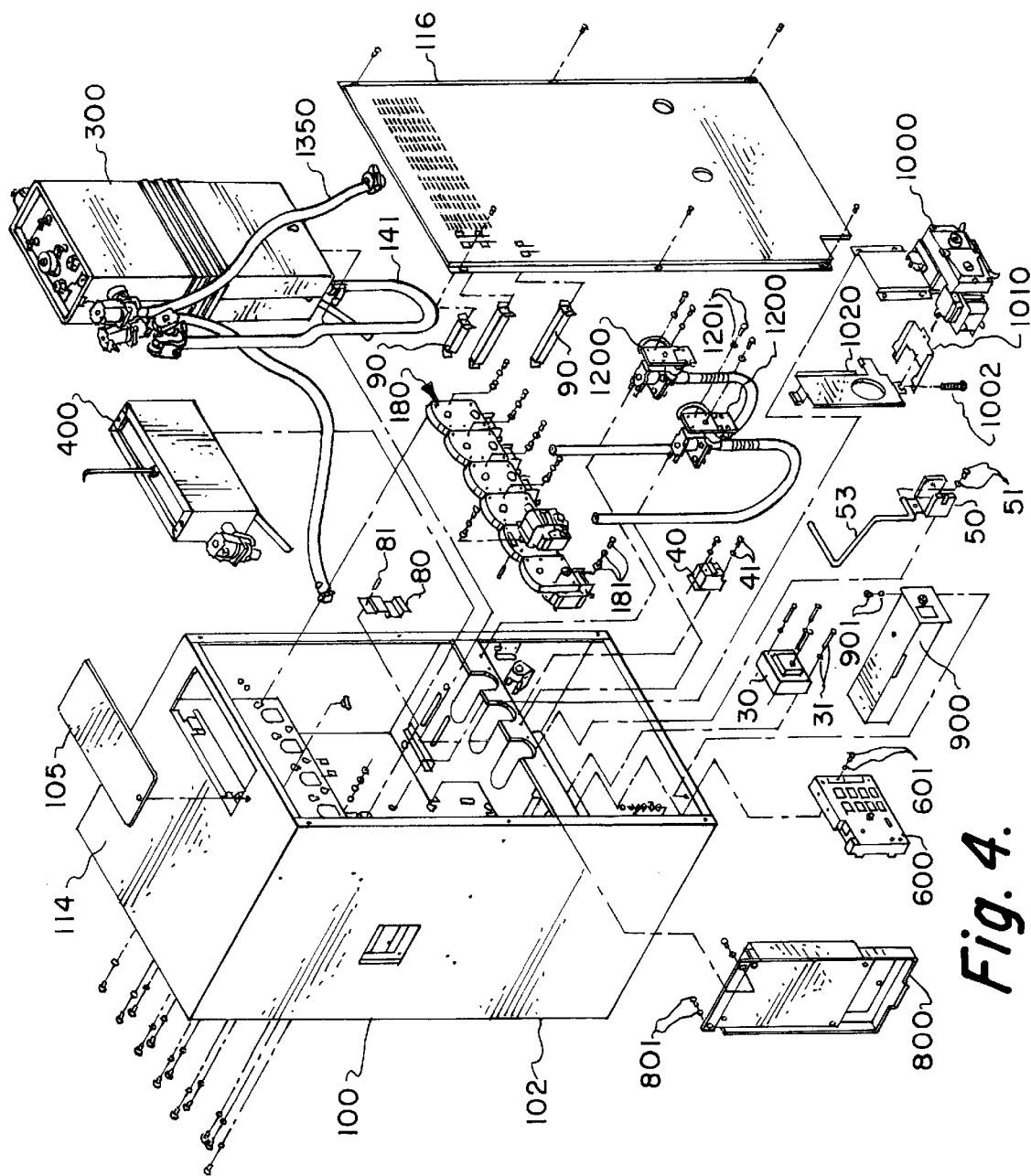
FIG. 4 is an exploded perspective view from the upper rear of a preferred embodiment of the invention.

As mentioned above, storage bins 132 also preferably include an ingredient dispensing element 138 such as an auger positioned between connector 137 and connector 139 to be operatively connected to a motor 180 (see FIG. 4). As is apparent in FIG. 3B, element 138 preferably includes an externally threaded portion along a longitudinal axis extending from connector 137 to connector 139. Connector 139 acts to engage with element 138 and to engage with an element on motor assembly 180 to permit the rotation of element 138 and the subsequent dispense of the ingredient from the storage bin 132 into product chute 136. By using a stepper motor assembly or similar technology, the rotation of the motor and auger (and resulting dispense of the ingredient from the storage bin) can be precisely controlled by the control means.

As described above, mixing assembly 1300 includes: funnel 1310; mixing bowl 1330; and mixing chamber 1370. Further illustrated in FIG. 3 is the connection of mixing bowl hose 1350 in addition to the mixing motor assembly 1360. Motor assembly 1360 includes a motor 1362 and a motor support bracket assembly 1366. Motor assembly 1360 engages with mixing assembly bracket 1384 and propeller 1382 to provide active mixing of water from mixing bowl hose 1350 and ingredients dispensed into funnel 1310. The preferred active mixing occurs in mixing chamber 1370 as the ingredient and water combination are descending through mixing assembly 1300. As will be appreciated by persons of ordinary skill in the art, the attachment of the motor to the support bracket assembly and the mixing bracket assembly to the chassis of the brewing machine can be accomplished by any suitable means, such as screwing, riveting, clipping, welding, or otherwise securing the assemblies to the frame. In addition, clips 160 are preferably provided in the machine wherever it is necessary or desirable to hold the tubing.

In FIG. 4, further illustrated is: hot water tank 300; cold water tank 400; ingredient board assembly 600; rear board assembly 800; fuse box assembly 900; brewer motor and bracket assembly 1000; and inlet valve assembly 1200. As illustrated, ingredient board assembly 600, rear board assembly 800, and fuse box assembly 900, are attached to cabinet assembly 102 by connecting elements 601, 801, and 901, respectively. However, persons of ordinary skill in the art will understand that although the connecting elements are preferably nuts and bolts, any suitable means including rivets, clips, or welds, would be appropriate whereby the devices can be secured to the frame.

The upper wall 114 of cabinet assembly 102 also includes access panel 105 that reduces the complications of getting access to service the components of hot water tank 300 due to its preferable configuration and positioning at the rear of the machine.

FIG. 4 further illustrates ingredient motor assembly 180 with respect to the rear of the ingredient storage assembly 130. Ingredient motor assembly 180 is secured to the frame of the brewing machine by way of connecting elements 181 wherein the connecting elements preferably constitute nuts and bolts, but alternatively could use any appropriate means including rivets, welding, or clips. Ingredient motor assembly 180 includes a plurality of individual motors corresponding to the number of ingredient storage bins 132 discussed above. Each of the motors preferably controls the dispensing of selected ingredients from its respective storage bin, by rotating its respective dispensing element or auger 138 (FIGS. 3A and 3B) in storage bins 132. As discussed herein, the amount of rotation of the motors (and the consequent volume of ingredient dispensed for brewing) are preferably controlled by computerized components that can be selectively programmed to accurately measure and dispense the individual ingredients into the dispensing means 1300 and 140.

FIG. 4 also illustrates the following components: a transformer 30; a heater relay 40; a weld bracket latch assembly 50; a lever 53; a brewer latch tongue 80; and valve stoppers 90, each of which is secured to the machine by elements 31, 41, and 51 respectively. Brewer latch tongue 80 also includes an extension spring 81. Also illustrated in FIG. 4 is brewer motor and bracket assembly 1000 to engage with bottom latch 1010 and brewer latch 1020. Also illustrated is a brewer spring 1002. As will be apparent from FIG. 4, weld bracket latch assembly 50, brewer latch tongue 80, and brewer motor and bracket assembly 1000 (including bottom latch 1010 and brewer latch 1020) preferably constitute a system to secure the brewer 140 to the frame of the brewing apparatus 100 yet still provide easy removal of the brewer 140.

Also in FIG. 4, tubing 141 appears to perhaps contact or even connect with the bottom of the tank 300. That is an illusion caused by the particular perspective of the figure. Instead, as more clearly indicated in FIGS. 6 and 2, the ends of tubing 141 preferably operably connects the tank 300 to the brewer assembly 140.

Figure 5:
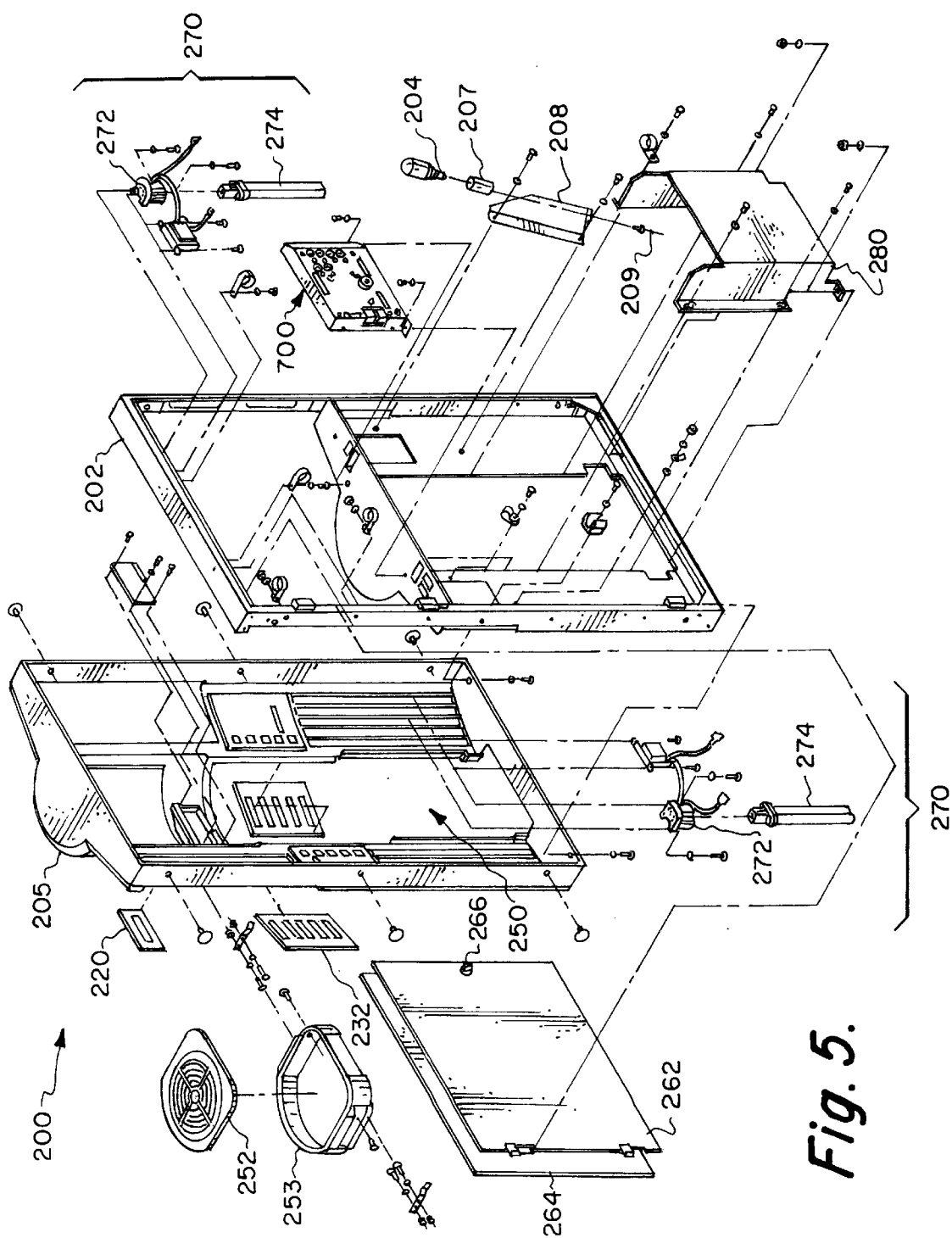
FIG. 5 is an exploded view of a preferred embodiment of the door assembly of the invention.

FIG. 5 includes further details of the preferred cabinet closure or door 200. Cabinet closure 200 preferably includes a frame 202 with a cover 205 to be placed and secured to the front of frame 202. Container holder area 250 preferably includes a plate element 252 and a plate support structure 253. The rear of the container holding area 250 (see FIG. 1) is preferably bounded by semi-cylindrical wall member 282 (FIG. 2) and wall member 280 which is secured to the inner side of door 202 by any suitable means, such as nuts and bolts.

As mentioned above, the preferred embodiment of the invention includes display areas that are preferably illuminated or backlit. The illumination or backlighting is provided by an assembly illustrated in FIG. 5, in which lighting assembly 270 includes power source 272 and lighting structure 274. Lighting assembly 270 is preferably configured to be placed in inner cabinet assembly 260 between cover 205 and door 262 and on the forward facing right and left sides of door assembly 200; however, persons of ordinary skill in the art will understand that the positioning of the lighting assembly 270 can vary depending on the desired locations of the corresponding display areas. The preferred embodiment of the invention further includes a reflective member 264 on the front surface of door 262 to enhance the lighting effect provided by lighting assembly 270. Door 262 also includes a latch 266 to secure door 262 to the frame 202 when it is closed.

As discussed above, the brewing chamber preferably is illuminated during the brewing process by a lighting device 204 positioned within cabinet closure 200. In FIG. 5, light 204 is connected to socket 207, which is secured to a bracket 208 which is secured to the frame of the door by a connecting element 209. To enhance the illuminative effects of lighting device 204, bracket 208 is preferably of a reflective material. As indicated elsewhere herein, the connecting element can embody a variety of items, including rivets, nuts and bolts, or welds.

FIG. 5 also illustrates front board assembly 700 which provides access to various controllers to clean, maintain, and operate the tea brewing machine. Front board assembly 700 is preferably positioned within inner cabinet assembly 260 and hidden from view when door 200 is open by the closed state of inner door 262. This provides the opportunity to regulate access to the controls of the front board assembly 700. Further details of front board assembly will be discussed below.

Figure 6:
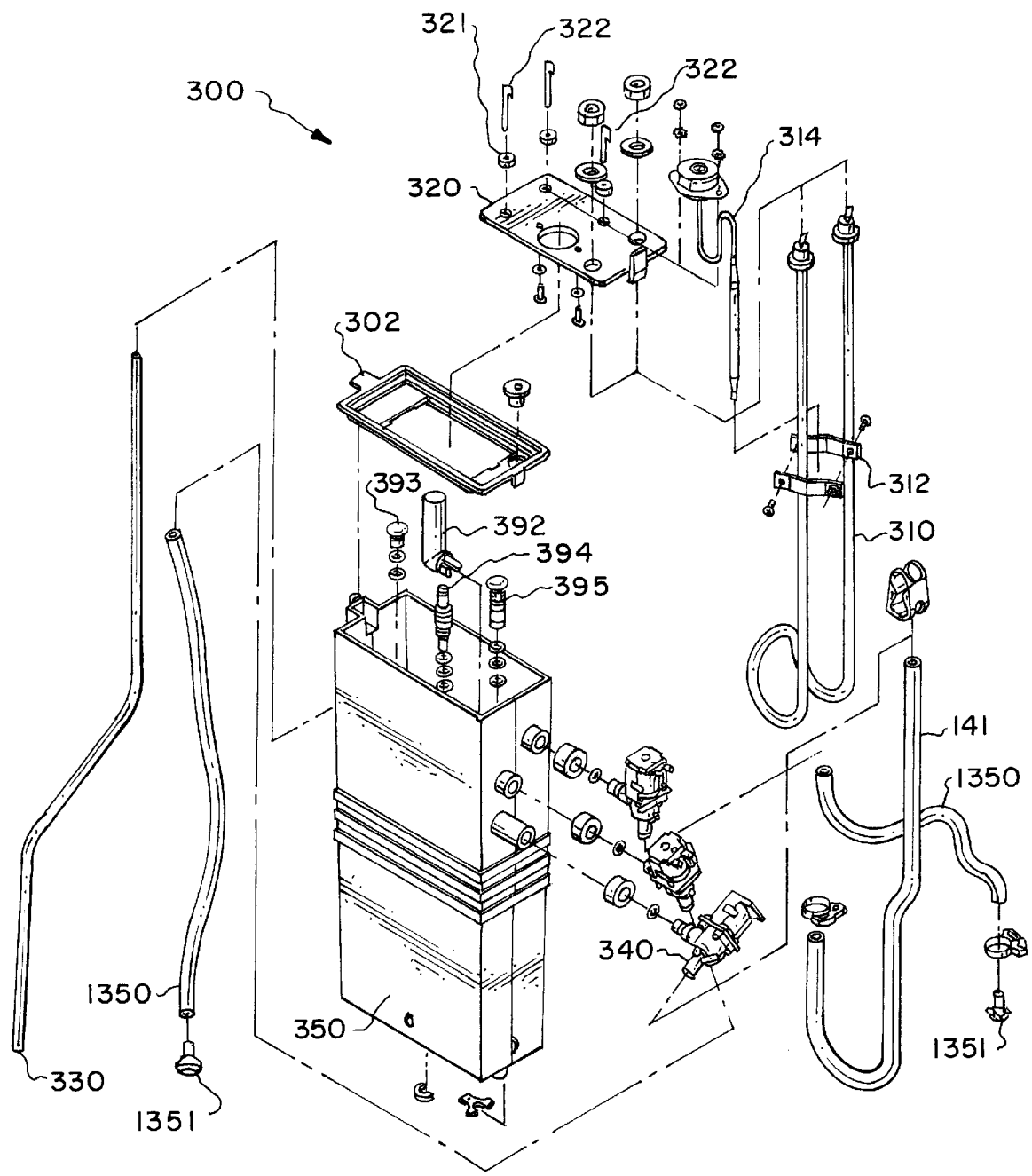
FIG. 6 is an exploded view of a preferred embodiment of the hot water tank assembly of the invention.

FIG. 6 illustrates a detailed configuration of the preferred embodiment of the hot water tank assembly 300. Hot water tank assembly preferably includes a body 350 made of any appropriate material, and preferably permits the long-term storage of water without corroding yet is easily cleaned. Water tank 300 preferably includes a top element 302 to engage with body 350. Top 302 is configured to receive probe support 320 in which a plurality of probes 322, a thermal cutoff switch 314, and heating element 310 are positioned to monitor the water level and temperature in hot water tank 300. The combination of thermal cutoff switch 314 and heating element 310 constitute a temperature regulator to regulate the temperature of the water in water tank 300. Persons of ordinary skill in the art will understand that probes 322 can be secured to probe plate 320 with a multitude of devices including the preferred use of grommets 321. Preferably, thermal cutoff switch 314 is positioned between two poles of heating element 310 and secured there by clamping means 312.

Hot water tank 300 also includes a plurality of valves 340 to direct the flow of hot water to various parts of the machine including hose 141 (and see FIG. 2) directing hot water into the brew chamber 142, and hose 1350 directing hot water into mixing assembly 1300. As can be appreciated from FIG. 3, hoses 1350 include connectors 1351 to facilitate engagement of hose 1350 with the mating element on mixing bowl 1330 (see FIGS. 2 and 3).

The preferred embodiment of hot water tank 300 also includes an overflow hose 330 and a drain 395. The preferred embodiment of the invention also includes an outlet 392, a water tank plug 393, and an inlet fitting 394. As indicated elsewhere herein, hoses and tubing preferably consist of flexible, corrosion-resistant material that is easy to clean and replace that can be secured to various sites within the machine by clamps, clips, or any other suitable element. Similarly, the more rigid components of the invention can be secured to the frame of the machine by screws, rivets, nuts and bolts, or even welding.

Figure 7:
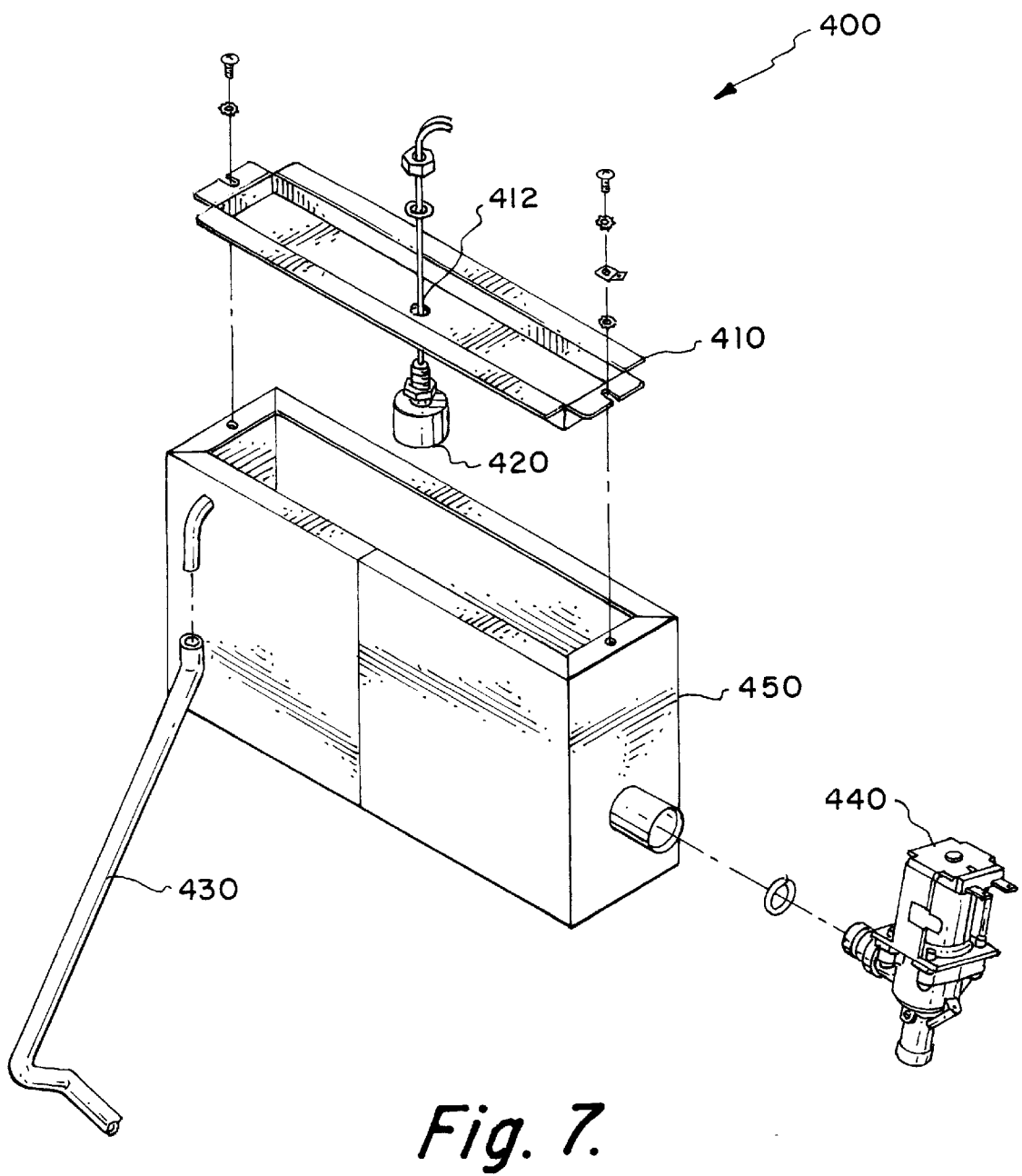
FIG. 7 is an exploded view of a preferred embodiment of the cold water tank assembly of the invention.

The preferred embodiment of cold water tank 400 is illustrated in FIG. 7, wherein cold water tank 400 includes a body 450 and a lid element 410 possessing retaining means 412 for a water level switch 420. The tank 400 also includes an overflow device 430 and an outflow valve 440 to direct the flow of ambient temperature water to tubing 1120 (FIG. 2) to direct the flow into a container receiving a brewed drink. Although the preferred embodiment does not include means to actively cool the water in water tank 400, it will be apparent to persons of ordinary skill in the art that a cooling element can be included to further lower the temperature of the water. Thus, the storage of ambient temperature water in cold water tank 400 coupled with the mixing of the water with the freshly brewed beverage, provides an economical and efficient method of cooling freshly brewed drinks.

Figure 8:
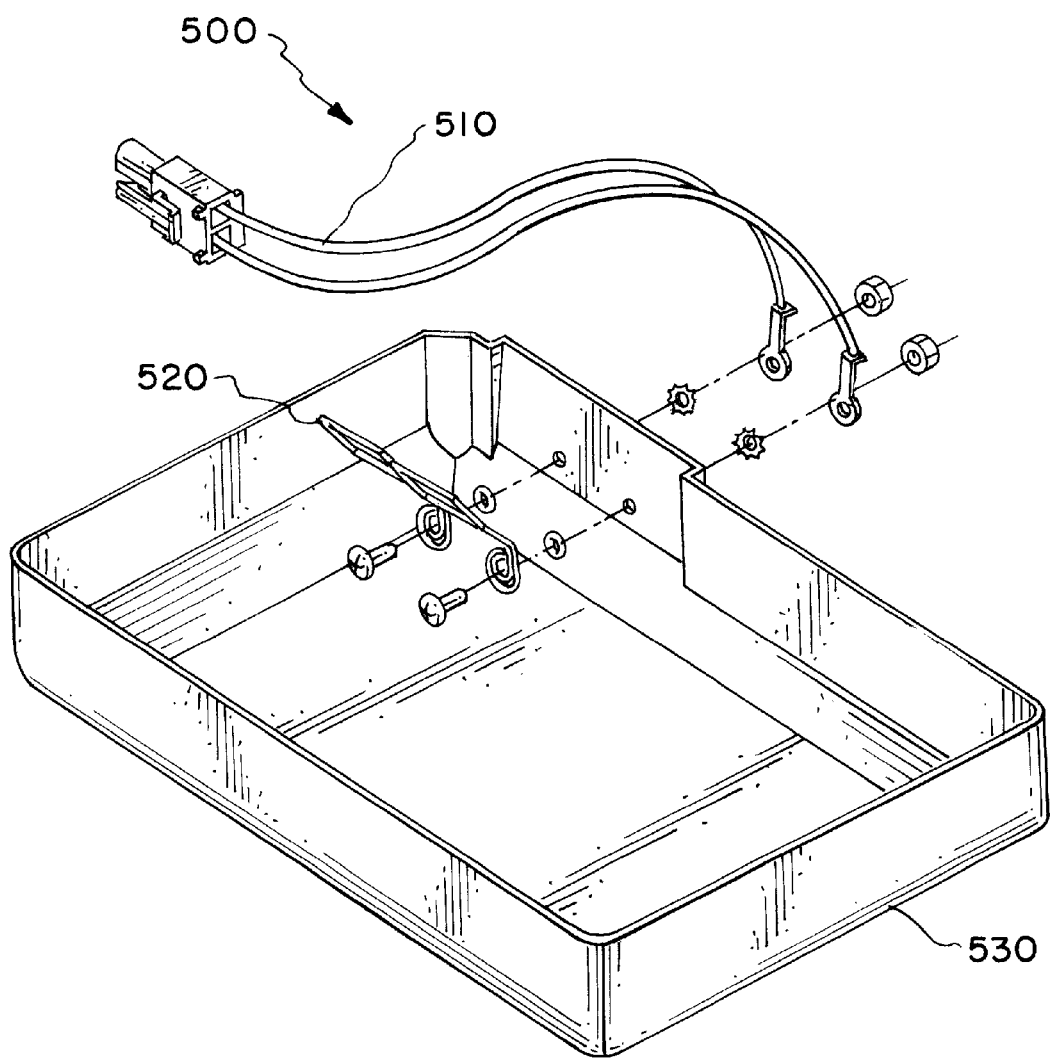
FIG. 8 is an exploded view of a preferred embodiment of the overflow tray assembly of the invention.

The preferred embodiment of the invention also includes overflow tray assembly 500 depicted in FIG. 8. Overflow tray assembly is configured and positioned to receive overflow hoses or devices, 330 and 430 (FIGS. 6 and 7, respectively), from water tanks, 300 and 400, respectively, to accommodate any excess flow of water from those tanks. Persons of ordinary skill in the art will appreciate that the overflow tray 530 can embody a variety of shapes and/or locations within or near the main brewing system and yet still fulfill its intended function. In the preferred embodiment, overflow tray assembly 500 is configured to be placed within the preferred housing apparatus 100 of the invention and includes an overflow sensor assembly including wiring harness 510 and a sensor 520 configured to retain overflow hoses 330 and 430 (FIGS. 6 and 7) and to signal the system that the overflow tray needs to be emptied. Persons of ordinary skill in the art will understand that the wiring harness 510 is operatively connected to the control system of the invention, and will further understand that the sensing and retaining abilities can alternatively be provided as individual elements.

Figure 9:
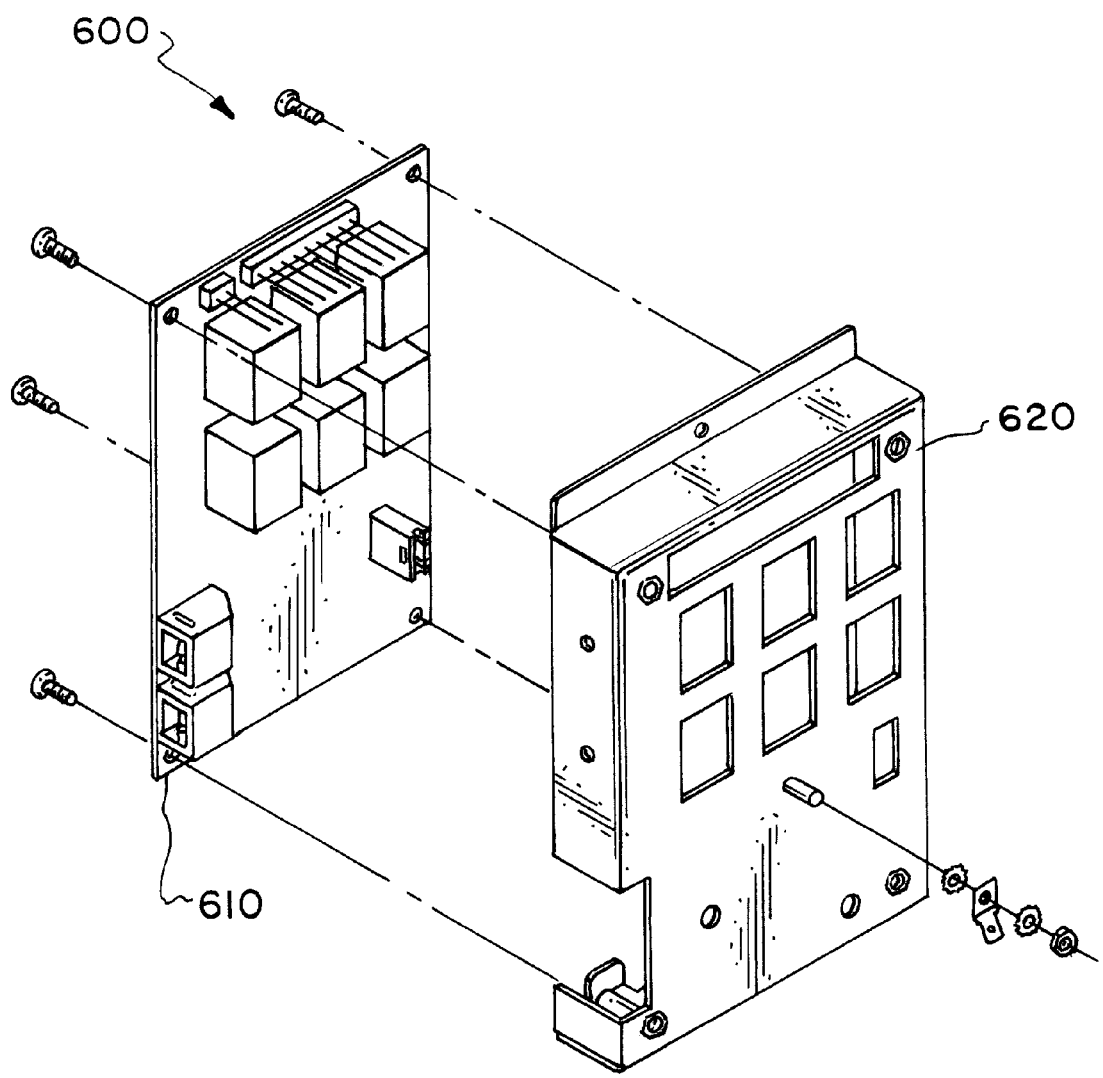
FIG. 9 is an exploded view of a preferred embodiment of the powder product board assembly of the invention.
Figure 10:
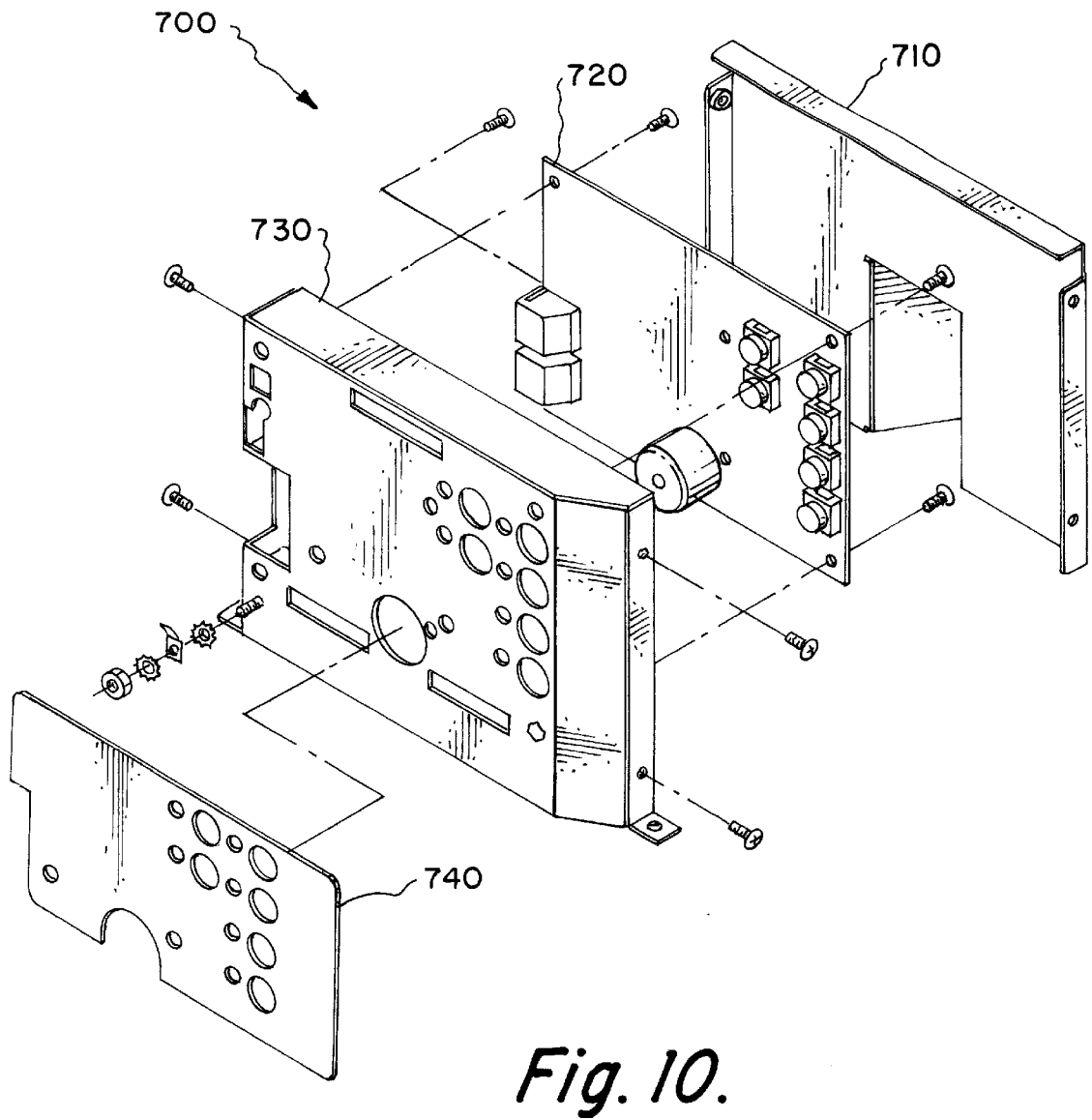
FIG. 10 is an exploded view of a preferred embodiment of the front board assembly of the invention.
Figure 11:
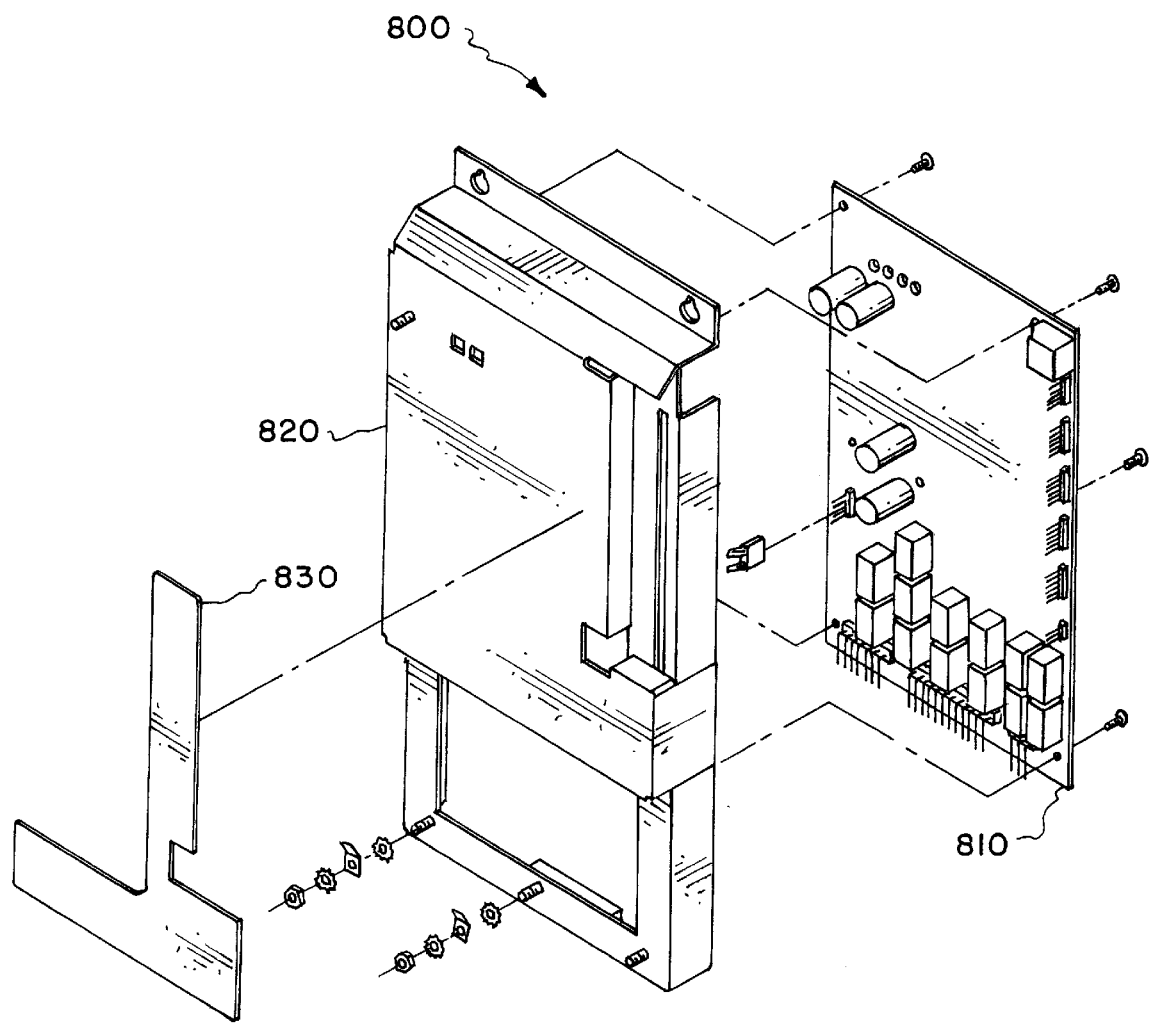
FIG. 11 is an exploded view of a preferred embodiment of the rear board assembly of the invention.

FIGS. 9–11 illustrate the preferred embodiment of the various circuit board assemblies 600, 700, and 800 that permit the preferred customizability of the settings for the ingredient board assembly 600, the front board assembly 700, and the rear board assembly 800. In general, the preferred embodiment of the invention can utilize any appropriate combination or configuration of circuit boards that enable an operator to make and adjust settings for preparing, brewing, and dispensing any brewed beverages. These settings can include, but are not limited to, brewing time, dispensed beverage amount, dispensed hot water amount, or number of brewing cycles. In that regard, each of the circuit boards preferably includes means (such as a telephone jack, computer port, etc.) for receiving information from another source (including, but not limited to, laptop or other computer or telephone systems possessing means for transferring data to the machine), to permit users to update and modify those settings. Persons of ordinary skill in the art will appreciate that the "programming" of the circuit boards can be accomplished either by the use of software or firmware wherein both or either of these elements can constitute programmable components.

Moreover, the functional and physical relationship between the various circuit boards, the control panels, and the message display screens can act as a control system permitting users to customize settings and receive instructions to operate the machine, and to react to a user's input in selected ways.

FIG. 9 depicts the preferred embodiment of the ingredient board assembly 600 including a circuit board assembly 610 and an ingredient board cover 620. Persons of ordinary skill in the art will understand that the preferred embodiment of the circuit board 610 includes a plurality of chips and also includes means for communicating to other devices which permits a operator to customize and/or modify the settings of the chips to control the dispensing and measuring of the various ingredients in the storage bins.

The preferred embodiment of the front board assembly 700 is illustrated in FIG. 10. Front board assembly includes: a support structure 710; a circuit board 720; a cover element 730; and a labeling element 740. The elements of the front board assembly 700 can be secured to each other by a variety of means including nuts and bolts, rivets, snap fits, or clips. Front board assembly 700 permits an operator to maintain, diagnose, and clean the brewing machine. For example, the settings of the circuit board 720 allow a user to input instructions to cause the machine to rinse and/or clean the brewer, to determine and track the number of beverages brewed further including monitoring of the number and types of beverages brewed, and to run the setup controls to alter any of the settings of the circuit board in this front board assembly 700.

Persons of ordinary skill in the art will further understand that the front board assembly 700 is operatively connected to the message display screen 220 to permit the user to receive instructions from the circuit board 720 and to respond appropriately. The user can thereby proceed with adjustments and/or maintenance of the machine in a logical, stepwise manner pursuant to the instructions displayed on the screen 220.

FIG. 11 illustrates the configuration of the preferred embodiment of rear board assembly 800 used to control, set, or adjust the settings of water temperature, the hot water tank, the brewer, and the cold water tank. In addition, it possesses means for adjusting overflow settings as well as other settings needed to ensure the proper operation of the machine. Rear board assembly 800 includes: a circuit board 810; a circuit board cover 820; and a identification element 830 to provide identification of the various controllers to make adjustments of the circuit board 810. As indicated above, the specific configuration and design of the circuit board is not necessary to completely understand the principles of the invention and that any suitable circuit board configuration could be utilized to achieve the same desirable benefits of customizability and ease of maintaining and monitoring the brewing system.

Figure 12:
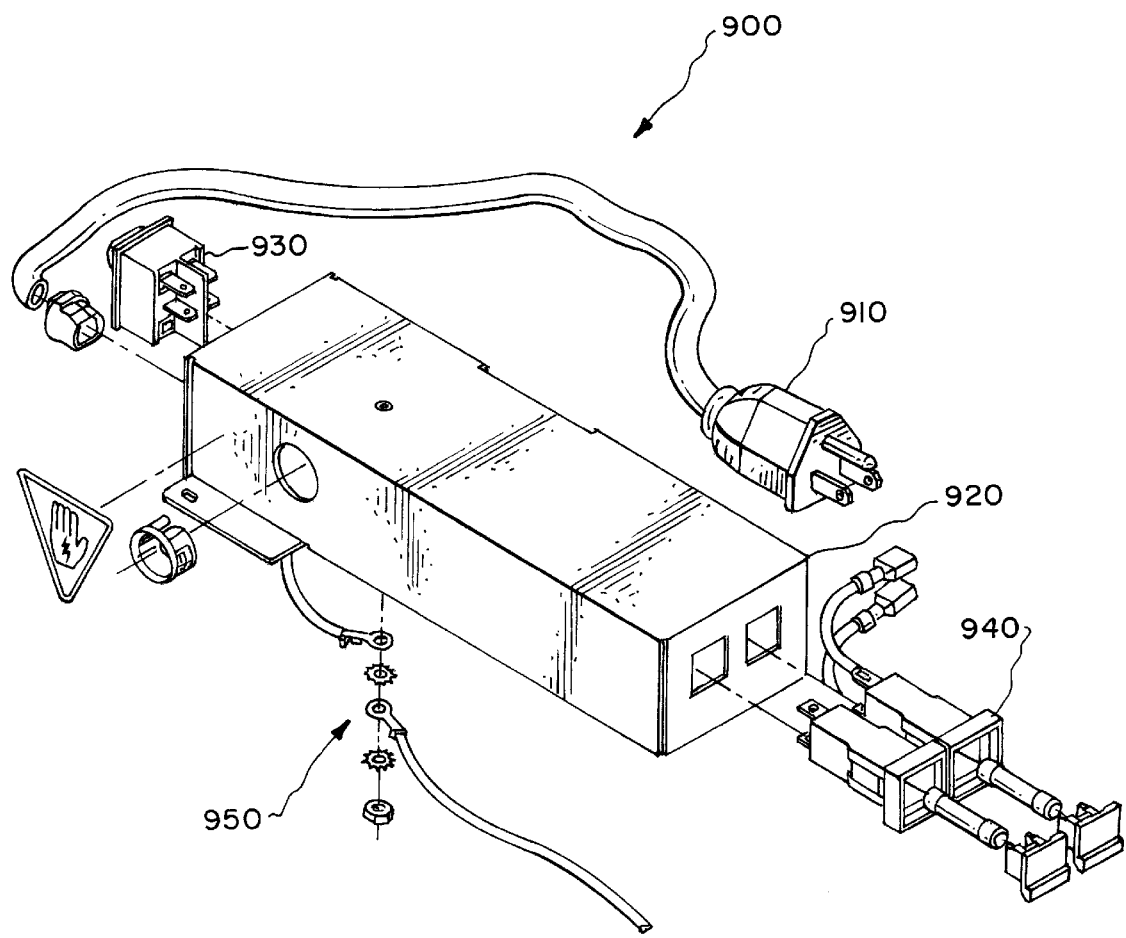
FIG. 12 is an exploded view of a preferred embodiment of the fuse box assembly of the invention.

The preferred embodiment of the invention also includes a fuse box assembly 900 illustrated in FIG. 12. Any appropriate fuse box assemblies can be used with the instant invention without departing from its scope; however, the preferred embodiment 900 includes: a power cord 910; a body portion 920; a power switch 930; a fuse holder assembly 940; and an electrical grounding system 950. As persons of ordinary skill in the art will appreciate, the preferred embodiment of the fuse box body 920 is made of metal or any other suitable material that conducts electricity and that the grounding system 950 is preferably connected to the frame of the brewing apparatus to prevent any electric shocks delivered to users.

Figure 13:
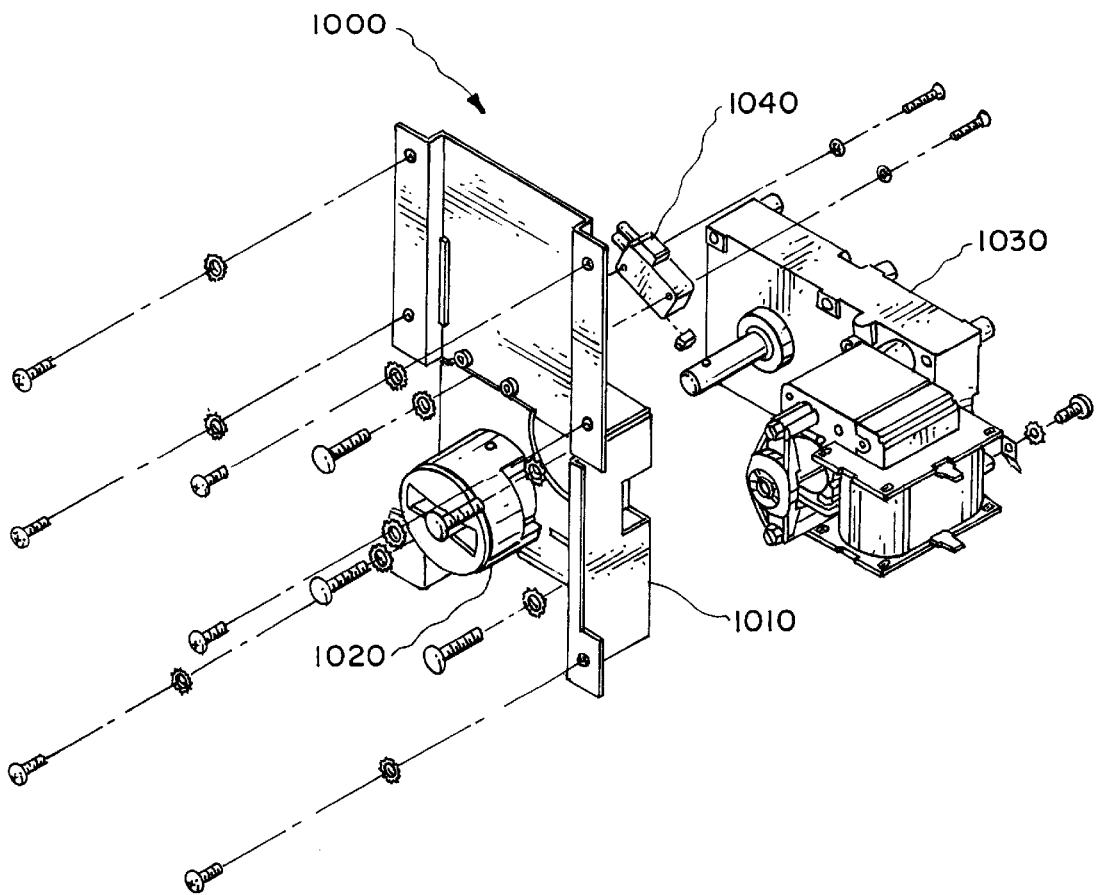
FIG. 13 is an exploded view of a preferred embodiment of the brewer motor and bracket assembly of the invention.

The invention also preferably includes a brewer motor and bracket assembly 1000 (FIG. 13) to be connected to brewer 140 (FIGS. 2 and 3) to permit operation of that brewer. FIG. 13 illustrates that assembly 1000 includes: a bracket element 1010; a brewer motor 1030; a power switch 1040; and a coupling element 1020 to connect brewer 140 to brewer motor 1030. As indicated above, any type of connecting elements, including nuts, bolts, screws, rivets, or clamps, can be used to connect the brewer motor 1030 to bracket 1010 and thence to the frame of the tea machine.

Figure 14:
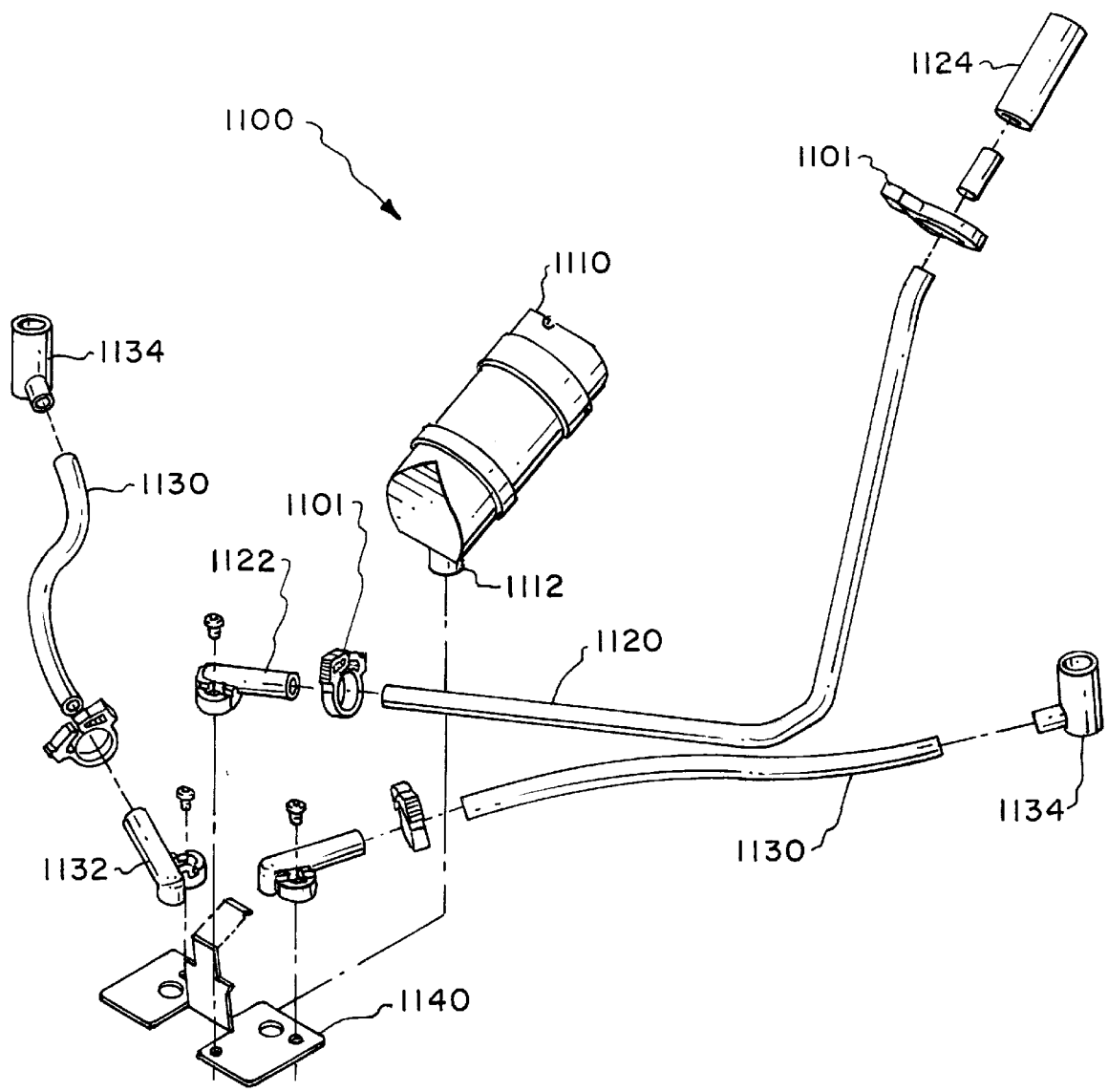
FIG. 14 is an exploded view of a preferred embodiment of the spout bracket assembly of the invention.

FIG. 14 illustrates a more detailed and exploded view of a preferred spout bracket assembly 1100 as previously described with respect to FIG. 2. Generally, spout bracket assembly includes: a brewer outflow channel 1110 with a brewer outflow spout 1112 situated away from the opening of the reservoir 144 (FIG. 2) and to be above the container filling area 250 (FIG. 1); a hot water tube 1120 connected to a valve or connector 1124 at an end to be connected to valve 340 of hot water tank 300 (FIG. 6) and at the other end a outflow member or spout 1122; a pair of tubes 1130 connected at one end to connector 1134 to attach to mixing chamber 1370 (FIG. 2) of mixing assembly 1300, and at the second end to outflow members or spouts 1132; and a bracket element 1140 to secure spouts members 1112, 1122, and 1132 adjacent one another in order to permit the desired filling of a beverage container. In addition, the various elements of the spout bracket assembly 1100 can be secured to various connectors by clamp elements 1101 and to the bracket member 1140 by screws, nuts, bolts, or clips.

Figure 15:
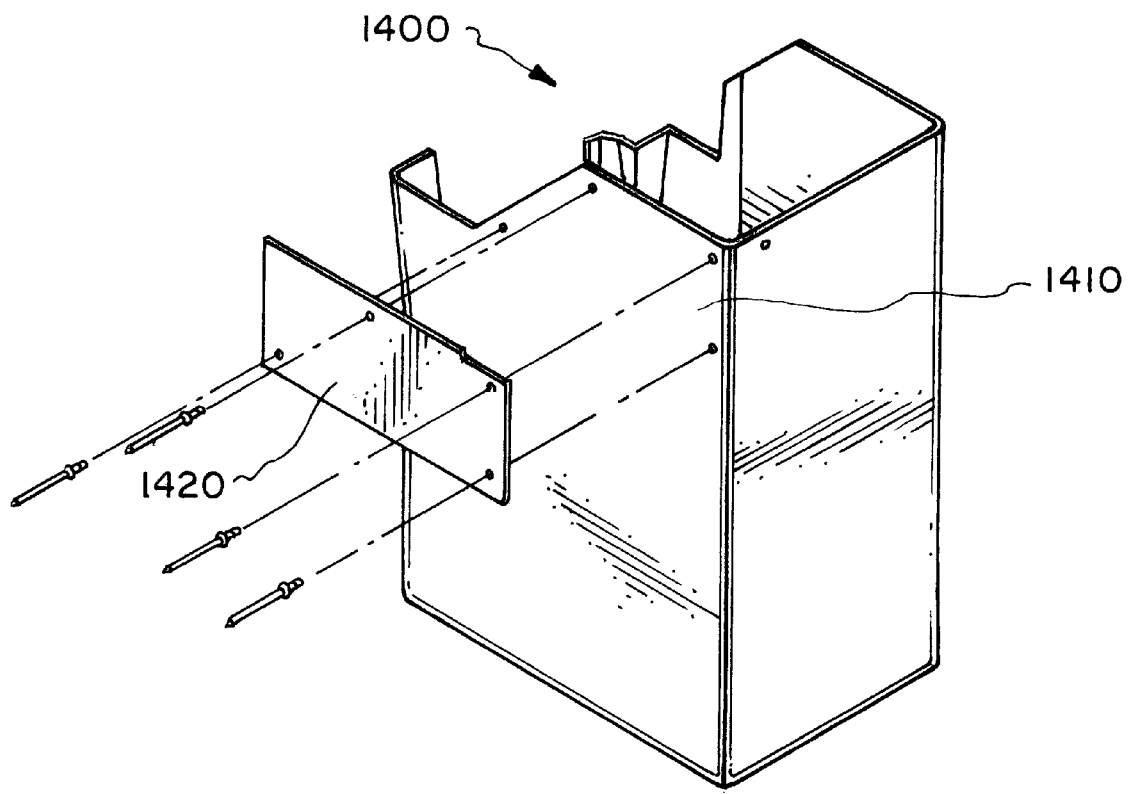
FIG. 15 is an exploded view of a preferred embodiment of the waste container assembly of the invention.

The preferred embodiment of the invention also includes a waste container member 1400 as illustrated in FIG. 15 to hold and contain the used tea leaves of coffee grounds from the brewer. Waste container member can be of any suitable size and configuration, and can be fabricated from any suitable material. Preferably, the waste container is lightweight and readily cleanable, and includes a container body 1410 and a deflector element 1420 to help guide the discarded leaves or grounds into container body 1410. The brewer utilized in the preferred embodiment of the invention preferably includes an automated wiping element to wipe the used beverage remains from a filter and out of the brewer. The preferred container 1400 holds those discards until such a time that it is convenient to empty the container and dispose of the waste in an efficient manner. For example, it would be incredibly burdensome to manually dispose of used leaves or grounds after each brewing cycle, especially when several users are successively using the machine. Therefore, the provision of means to temporarily hold those remains substantially increases the usefulness of the machine, especially for retail applications, by decreasing the amount of time necessary to dispose of the remains per individual serving.

Figure 16:
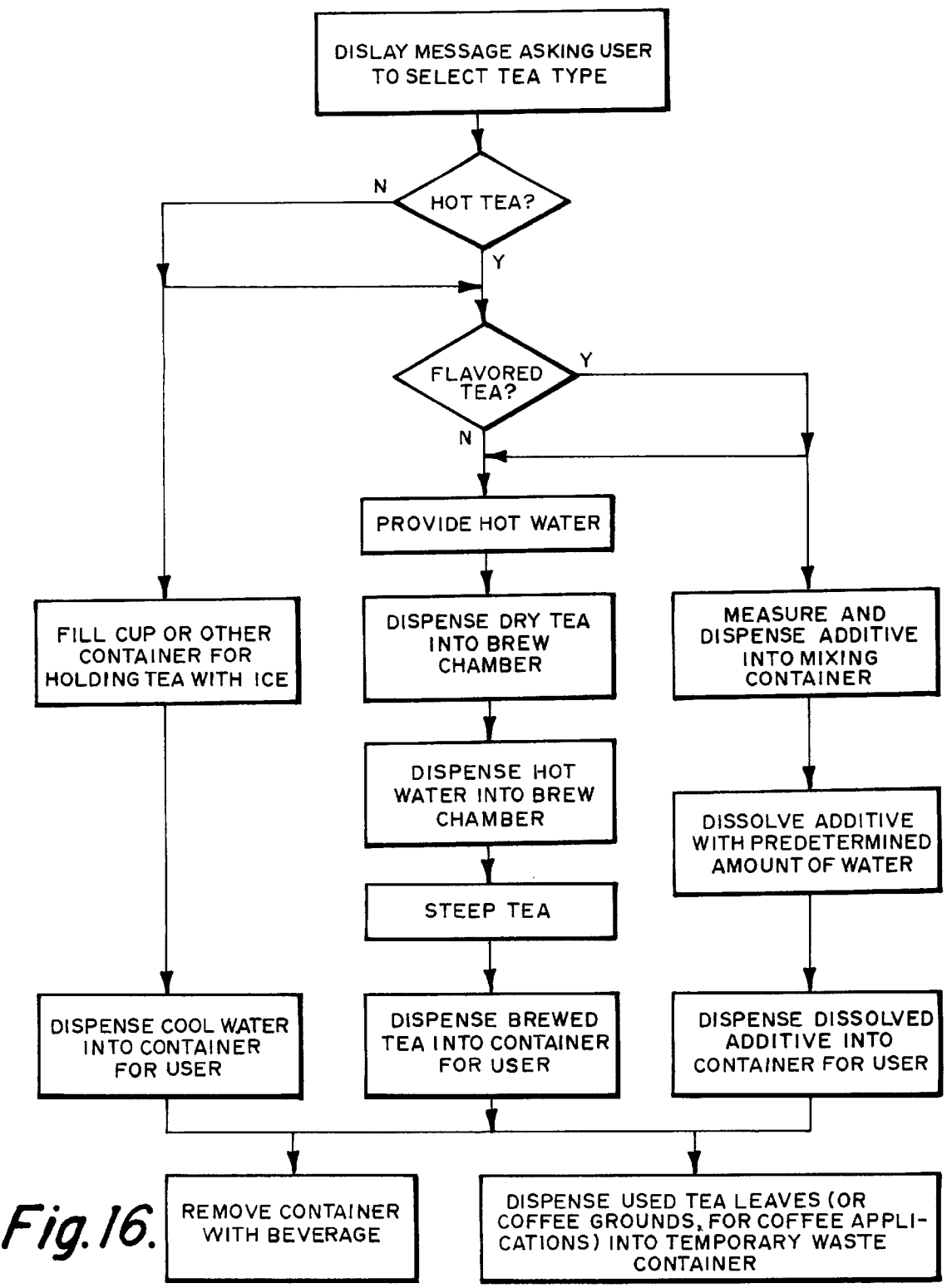
FIG. 16 is a flow chart illustrating a preferred method of making a single serving of tea using the invention.

A preferred method of using the invention is illustrated in the flow chart of FIG. 16 and includes the steps of: selecting a desired type of tea or coffee in response to a display message requesting a user to select the tea or coffee type; providing a heated water supply; dispensing dry tea leaves or coffee grounds into a brew chamber; delivering heated water to the brew chamber; steeping or brewing the tea or coffee; delivering the freshly brewed tea or coffee into a container for consuming the drink; and dispensing the used leaves or grounds into a separate container.

If the type of tea selected is a cold type, the preferred method further includes the steps of loading a container for consuming a beverage with ice before the delivery of the brewed beverage, and delivering a predetermined amount of ambient temperature water to the container for consuming the beverage concurrent with the delivery of the brewed beverage. Among other things, the ambient water helps cool the beverage.

If the type of tea includes a flavoring, additional steps preferably include: measuring and dispensing at least one flavoring or additive into a mixing container; dissolving the additive with a predetermined amount of water; and delivering the dissolved flavoring into the container for consuming the beverage concurrent with the delivery of the brewed beverage into the container.

Persons of ordinary skill in the art will understand that the left and right portions of FIG. 16 are the same, but for the step of filling the container with ice and dispensing cool water into the container steps that are preferably involved for making cool or iced tea.

Based on the foregoing description of the invention enabling one to make and use the invention, it will also be apparent to one of ordinary skill in the art that any and/or all of the aforementioned method steps can be automated.

The apparatus and methods of our invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

We claim:

1. An apparatus for freshly brewing and dispensing a single-serving of a beverage including the following components: at least one water tank; a temperature regulator to regulate water temperature in said at least one water tank; a control system by which a user can request said brewing and dispensing of a single-serving of a beverage; a measuring device and a dispenser to measure and dispense a select quantity of water for said fresh brewing in response to said control system; at least one storage area to store a dry form of said beverage; a brewer including at least one outflow member; said brewer being positioned to receive the dry form of said beverage from said storage area and to receivers water from said at least one water tank to brew said beverage and said at least one outflow member being positioned to direct the flow of said beverage from said brewer to a disposable container for use by the user; and at least one outlet distinct from and located near said brewer outflow member, said at least one outlet positioned to provide selective outflow of a beverage dilutant into said beverage without said dilutant contacting said brewer.

2. The apparatus of claim 1 further including a housing apparatus wherein each of said components are contained within said housing apparatus.

3. The apparatus of claim 1 further including at least one opening in said housing apparatus to permit viewing of a brewing process.

4. The apparatus of claim 1 further including at least one bin to store a beverage additive wherein said at least one bin includes a measuring and dispensing device to measure and dispense said beverage additive to said beverage in response to said control system.

5. The apparatus of claim 4 wherein said beverage additive changes the flavor of said beverage.

6. The apparatus of claim 1 wherein said dilutant changes the flavor of said beverage.

7. The apparatus of claim 1 wherein said dilutant changes the temperature of said beverage.

8. The apparatus of claim 1 further including automated means to dispose of remnants of the brewed beverage from said brewer and a container to contain the disposed remnants of the brewed beverage.

9. The apparatus of claim 1 in which said control system further includes an electronic control display to control the selection and brewing of said beverage.

10. The apparatus of claim 1 in which said control system further includes an electronic control display to maintain and clean said apparatus.

11. The apparatus of claim 8 or claim 9 wherein functionality of said electronic control display can be modified and updated.

12. The apparatus of claim 11 wherein said functionality of said electronic control display can be modified and updated by programmable components.

13. The apparatus of claim 1 or claim 2 or claim 3 or claim 4 or claim 5 or claim 6 or claim 7 or claim 8 or claim 9 or claim 10 wherein said beverage is tea.

14. A tea brewing machine for brewing a fresh, single-serving of tea, including a cabinet assembly, at least one water supply, a brewer, an outflow apparatus to receive said single-serving of tea from said brewer, at least one storage area for tea leaves prior to them being brewed, at least one storage area for tea additives, means for heating said water supply, means for selectively cooling said single serving of tea, tea additive dispensing means for dispensing said tea additives from said storage area, wherein said tea additive dispensing means permits the nearly simultaneous but independent outflow of brewed tea and tea additives into a container removable by a consumer.

15. The machine of claim 14 wherein said outflow apparatus includes a plurality of spouts for dispensing said tea and said tea additives.

16. The machine of claim 14 further including a view port in said cabinet assembly to permit a user to observe internal operation of the machine.

17. A method of brewing tea with the machine of claim 14 or claim 15 or claim 16 including the steps of: the tea leaves falling into a brewing chamber of said brewer; dispensing hot water into said brewing chamber containing the tea leaves; and steeping the tea.

18. The machine of claim, 14 or claim 15 or claim 16 further including a control panel to permit a consumer to select a preferred flavor and style of tea.

19. An apparatus for making a serving of tea wherein said apparatus includes: an electronic control panel with an instructional message screen; at least one water inflow device; a water heating device; a brewer wherein said brewer receives dry leaves of tea from at least one tea storage bin and said brewer receives heated water after the receipt of said leaves of tea; an outflow member connected to said brewer to direct the outflow of said tea to a container removable by a consumer; and at least one element adjacent said outflow member for independently delivering a tea additive from a tea additive storage area to said container removable by a consumer wherein said tea additive alters the flavor of said serving of tea.

20. A system for freshly brewing and dispensing a single-serving of a beverage including: at least one water tank; a temperature regulator to regulate water temperature in said at least one water tank; a measuring device and a dispenser to measure and dispense a selected quantity of water for said fresh brewing; at least one storage area to store a dry form of said beverage; a brewer including at least one outflow member wherein said brewer receives the dry form of said beverage from said storage area and receives water from said at least one water tank to brew said beverage; at least one dispenser independent of said brewer outflow member, said independent dispenser capable of dispensing an additive into a container for a consumer to consume a beverage, and to be mixed with said beverage in said container and not mixed in said brewer; and a control system by which a user can request brewing and dispensing of a single-serving of a beverage wherein said control system includes: a message display screen; a plurality of selectors for selecting a type of said beverage; and programmable components to permit a user to control brewing parameters of said beverage.

21. The system of claim 20 wherein said brewing parameters include: brewing time, dispensed beverage amount; dispensed hot water amount; or number of brewing cycles.

* * * * *

UNITED STATES PATENT AND TRADEMARK OFFICE
CERTIFICATE OF CORRECTION

PATENT NO. : 6,182,555 B1
DATED : February 6, 2001
INVENTOR(S) : Rick Scheer, Jeff Farris It is certified that error appears in the above-identified patent and that said Letters Patent is hereby corrected as shown below:

<u>Column 17,</u>
Line 62, "receivers" should read -- receive --.

Signed and Sealed this

Twenty-sixth Day of March, 2002

Attest:

JAMES E. ROGAN
*Attesting Officer*     *Director of the United States Patent and Trademark Office*